(12) United States Patent
Lin et al.

(10) Patent No.: US 8,468,335 B2
(45) Date of Patent: Jun. 18, 2013

(54) RECONFIGURABLE SYSTEM HAVING PLURALITY OF BASIC FUNCTION UNITS WITH EACH UNIT HAVING A PLURALITY OF MULTIPLEXERS AND OTHER LOGICS FOR PERFORMING AT LEAST ONE OF A LOGIC OPERATION OR ARITHMETIC OPERATION

(75) Inventors: Kenneth Chenghao Lin, Shanghai (CN); Haoqi Ren, Shanghai (CN); Zhongmin Zhao, Shanghai (CN); Bingchun Zhang, Shanghai (CN); Changchun Zheng, Shanghai (CN)

(73) Assignee: Shanghai Xin Hao Micro Electronics Co. Ltd., Shanghai (CN)

( * ) Notice: Subject to any disclaimer, the term of this patent is extended or adjusted under 35 U.S.C. 154(b) by 66 days.

(21) Appl. No.: 13/187,841

(22) Filed: Jul. 21, 2011

(65) Prior Publication Data

US 2012/0191967 A1    Jul. 26, 2012

Related U.S. Application Data

(63) Continuation of application No. PCT/CN2010/000072, filed on Jan. 15, 2010.

(30) Foreign Application Priority Data

Jan. 21, 2009    (CN) .......................... 2009 1 0045980

(51) Int. Cl.
     *G06F 1/24*      (2006.01)
     *G06F 15/76*     (2006.01)

(52) U.S. Cl.
     USPC ........................................... 713/100; 712/15

(58) Field of Classification Search
     USPC ............................................ 713/100; 712/15
     See application file for complete search history.

(56) References Cited

U.S. PATENT DOCUMENTS

| | | | | |
|---|---|---|---|---|
| 5,956,518 A | * | 9/1999 | DeHon et al. | 712/15 |
| 6,622,233 B1 | * | 9/2003 | Gilson | 712/11 |
| 8,261,042 B2 | * | 9/2012 | Kanstein et al. | 712/15 |
| 2002/0103841 A1 | * | 8/2002 | Parviainen | 708/523 |
| 2002/0108063 A1 | * | 8/2002 | Lee et al. | 713/300 |
| 2003/0200418 A1 | * | 10/2003 | DeHon et al. | 712/15 |
| 2007/0143577 A1 | * | 6/2007 | Smith | 712/10 |
| 2008/0320293 A1 | * | 12/2008 | Rofougaran et al. | 713/1 |
| 2009/0100286 A1 | * | 4/2009 | Vorbach et al. | 713/501 |
| 2009/0113169 A1 | * | 4/2009 | Yang et al. | 712/15 |
| 2010/0122105 A1 | * | 5/2010 | Arslan et al. | 713/500 |

* cited by examiner

*Primary Examiner* — Thomas Lee
*Assistant Examiner* — Robert Cassity
(74) *Attorney, Agent, or Firm* — Anova Law Group, PLLC

(57) ABSTRACT

A reconfigurable data processing platform is disclosed. The reconfigurable data processing platform includes a reconfigurable universal data processing module, a configuration memory, and a reconfiguration control unit. The reconfigurable universal data processing module contains a plurality of basic units each capable of being configured to perform a unit of at least one of a logic operation and an arithmetic operation. The configuration memory is coupled to the reconfigurable universal data processing module to provide configuration information to be used to configure the plurality of basic units. Further, the reconfiguration control unit is coupled to the reconfigurable universal data processing module and the configuration memory to provide control signals for configuration of the plurality of basic units.

17 Claims, 26 Drawing Sheets

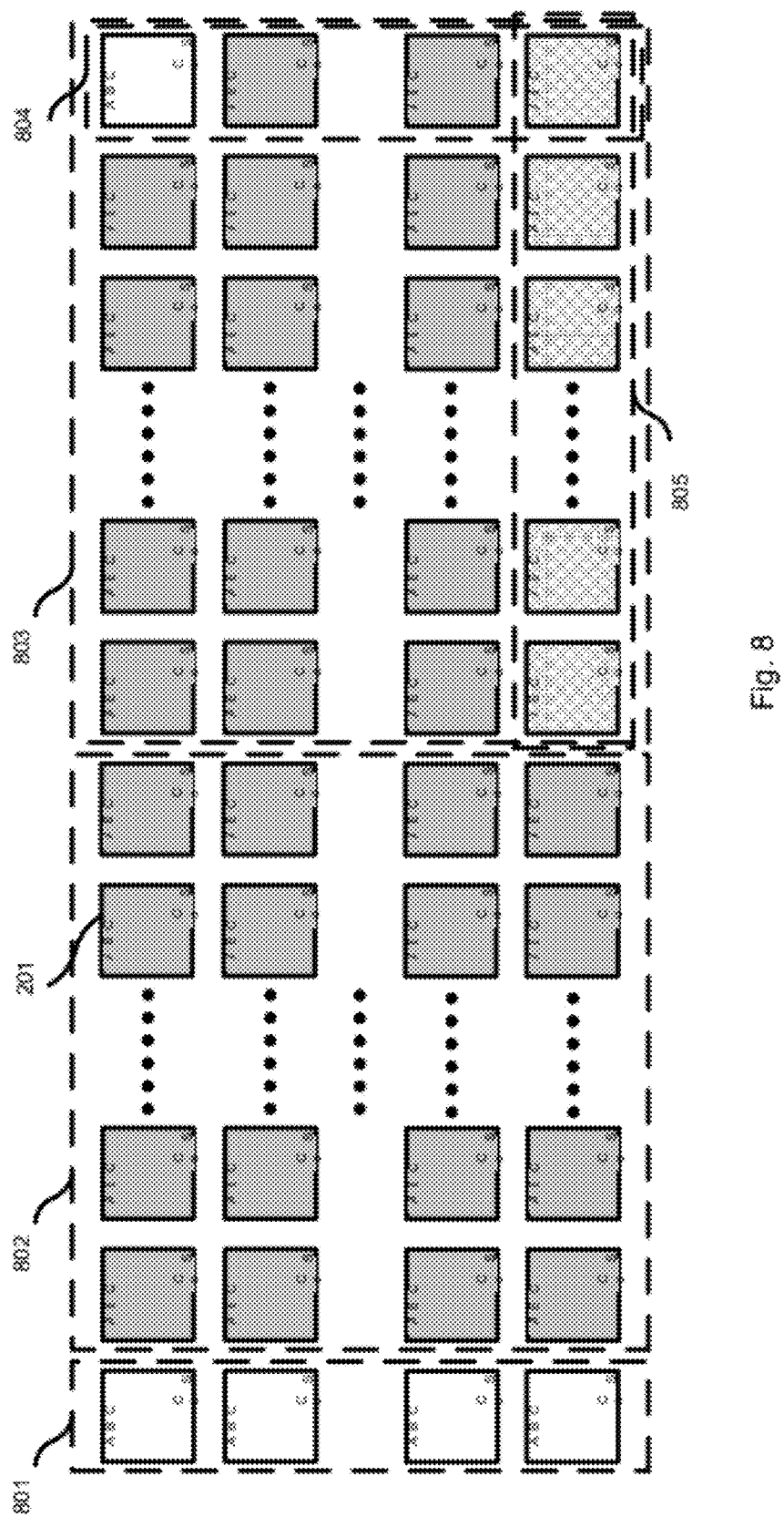

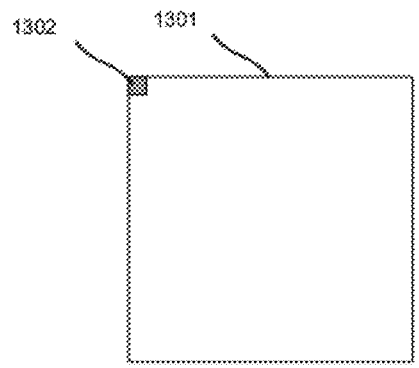
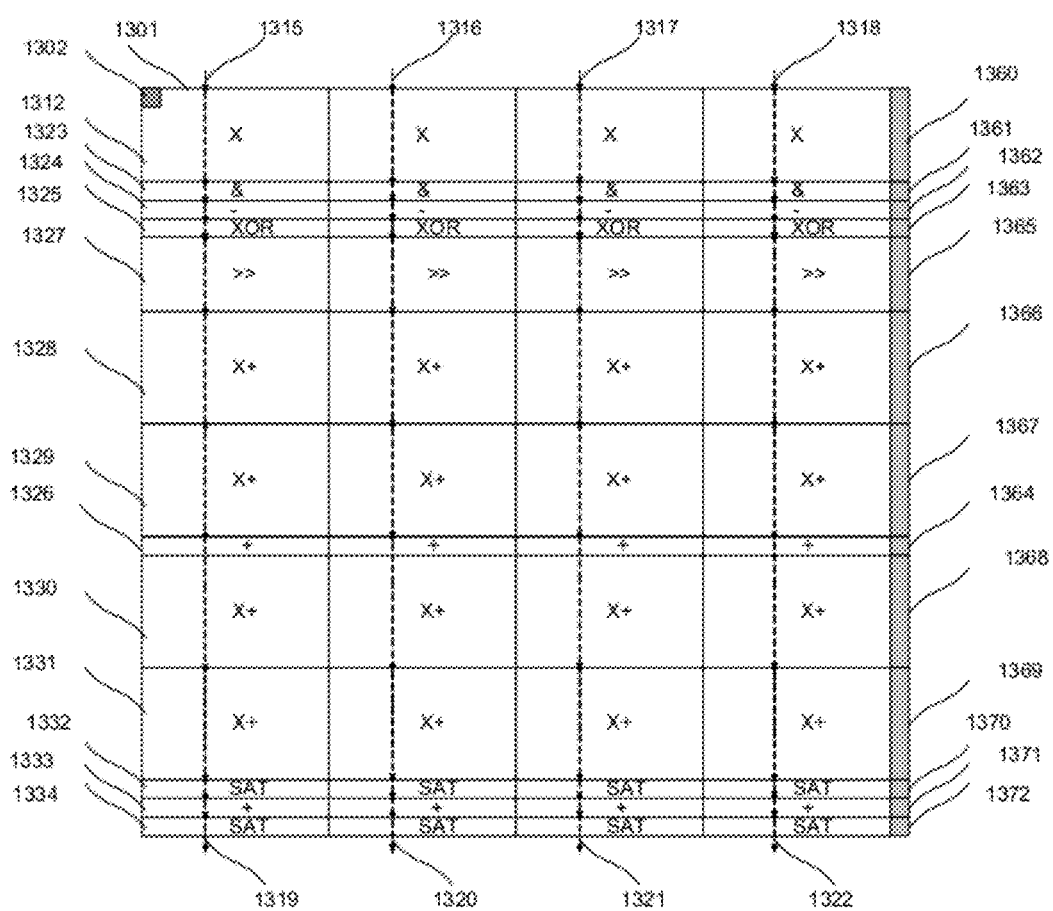

RECONFIGURABLE SYSTEM HAVING PLURALITY OF BASIC FUNCTION UNITS WITH EACH UNIT HAVING A PLURALITY OF MULTIPLEXERS AND OTHER LOGICS FOR PERFORMING AT LEAST ONE OF A LOGIC OPERATION OR ARITHMETIC OPERATION

CROSS-REFERENCES TO RELATED APPLICATIONS

This application is a continuation application of PCT application No. PCT/CN2010/000072, filed on Jan. 15, 2010, which claims the priority of Chinese patent application No. 200910045980.6, filed on Jan. 21, 2009, the entire contents of all of which are incorporated herein by reference.

FIELD OF THE INVENTION

The present invention generally relates to integrated circuit (IC) technologies and, more particularly, to the methods and systems related to configurable data processing platforms.

BACKGROUND

Progresses in the multimedia technology are making new demands on the functionalities of integrated circuits (ICs), such as chips capable of processing data flow in high speed, performing a large number of high-speed addition, multiplication, fast Fourier transform (FFT), and discrete cosine transform (DCT) operations, and updating functionalities quickly to meet fast-changing market demands.

Traditional general-purpose processors (CPU) and digital signal processors (DSP) are both flexible in functionalities. By updating corresponding software applications, the CPU and DSP can be used for different applications to meet the needs of users. However, due to limited computing resources in a CPU, the CPU does not have adequate capability to process data flow or high throughput, and thus is limited on the applications. Even when multi-core architectures are used in the CPU, the computing resources are still limited, and the degree of parallelism is also limited by the available software applications. Further, the allocation of computing resources is also restricted in the CPU and its throughput is still not satisfactory.

Compared with the CPU, a DSP applies certain optimization on computing resources and also adds more operation units. However, the computing resources of the DSP are still limited. In certain DSP chips, such as the asynchronous array of simple processors (ASAP) from UC Davis, multipliers, adders, shifters and other components are directly implemented in a module, the module can then be reused so that a chip has a large number of computing resources. However, the chip may have insufficient flexibility in that the ways for configuring the chip are limited.

An application specific integrated circuit (ASIC) chip has the capability for data flow processing and high throughput to meet the demand for a large number of high-speed data operations. However, the ASIC chip often has a long design period and high cost. For example, for a 90 nm ASIC chip, the non-recurring engineering cost (NRE) can easily exceed several million dollars. At the same time, the ASIC chip also lacks flexibility and cannot change functionalities when the market demands change. Rather, a new ASIC chip needs to be re-designed. If an ASIC chip is implemented to achieve different operation modes, such as being compatible with different video decoding standards, it may require different modules to be designed for the different video decoding standards and integrated into a single chip, which may significantly increase cost.

Compared with the ASIC, a field programmable gate array (FPGA) is more flexible and can be configured according to different applications. Currently, the FPGAs on the market are mainly based on lookup table (LUT), and a chip designed based on the FPGA often has low NRE and low design cost. However, the FPGA is mainly used for random logic and can easily realize logic operations such as two-input or three-input exclusive AND and exclusive OR, etc. But when the FPGA is used for arithmetic operations such as multiplication, the synthesized multiplication and other operation units may often have a large chip area. Although the FPGA often has its own multiplier, such as an 18×18 multiplier, it may be difficult to configure such multiplier into a different multiplier, such as a 32×32 multiplier or an 8×8 multiplier. Further, when the FPGA is used in a design, the interconnection delay counts for a large part of the total FPGA delay. For example, when Lattice's model LFSC25 FPGA is used to implement cyclical redundancy check (CRC) calculation, the interconnection delay may count for 78.3% of the total delay. Therefore, the interconnection delay in the FPGA may substantially limit its performance. In addition, the FPGA interconnection delay is often not known until the design is mapped onto the FPGA. Thus, in a FPGA-based design, because the approximate interconnection delay is not known at design time, the design may need to be revised several times in order to reduce the delay. The design period may then be prolonged.

The disclosed methods and systems are directed to solve one or more problems set forth above and other problems.

BRIEF SUMMARY OF THE DISCLOSURE

One aspect of the present disclosure includes a reconfigurable data processing platform. The reconfigurable data processing platform includes a reconfigurable universal data processing module, a configuration memory, and a reconfiguration control unit. The reconfigurable universal data processing module contains a plurality of basic units each capable of being configured to perform a unit of at least one of a logic operation and an arithmetic operation. The configuration memory is coupled to the reconfigurable universal data processing module to provide configuration information to be used to configure the plurality of basic units. Further, the reconfiguration control unit is coupled to the reconfigurable universal data processing module and the configuration memory to provide control signals for configuration of the plurality of basic units.

Other aspects of the present disclosure can be understood by those skilled in the art in light of the description, the claims, and the drawings of the present disclosure.

BRIEF DESCRIPTION OF THE DRAWINGS

FIG. 8 illustrates an exemplary configuration for floating-point multiplication operations consistent with the disclosed embodiments;

FIG. 13A illustrates an exemplary un-configured reconfigurable universal data processing module consistent with the disclosed embodiments;

FIG. 13B illustrates an exemplary configuration for a single instruction stream multiple data stream (SIMD) universal data processing module consistent with the disclosed embodiments;

DETAILED DESCRIPTION

Figure 1:
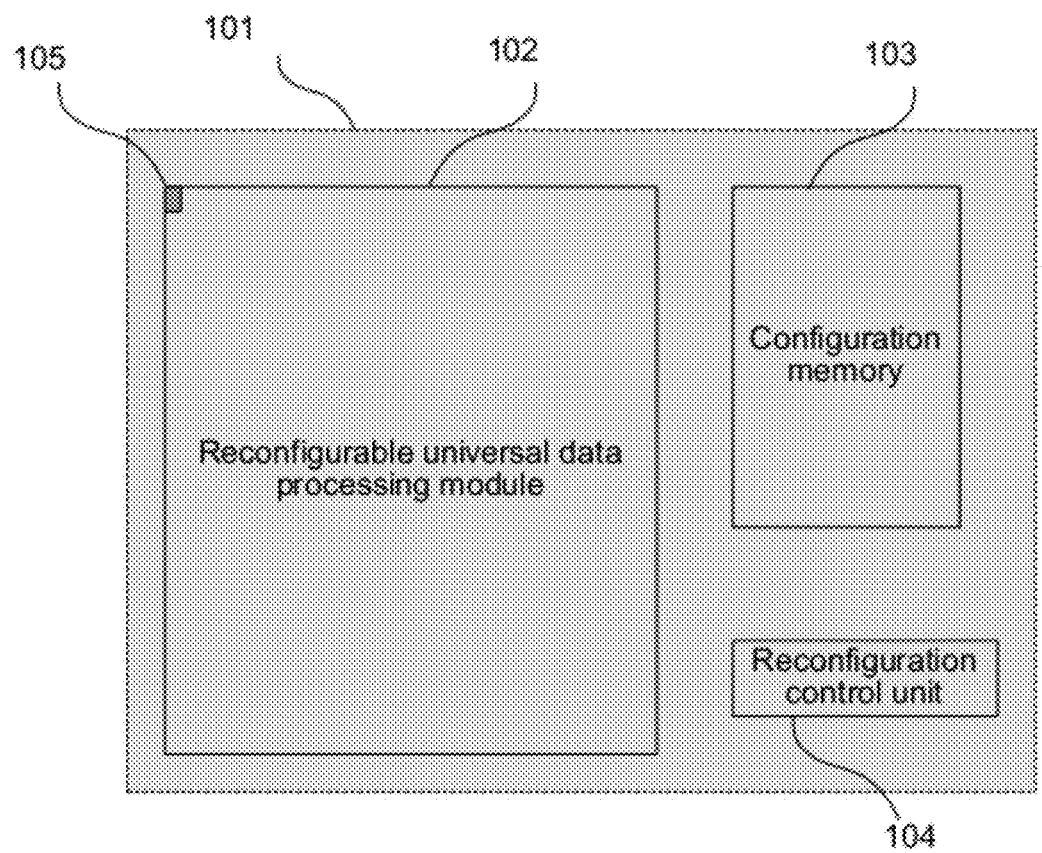
FIG. 1 illustrates an exemplary reconfigurable data processing platform consistent with the disclosed embodiments.

Reference will now be made in detail to exemplary embodiments of the invention, which are illustrated in the accompanying drawings. FIG. 1 shows an exemplary reconfigurable data processing platform consistent with the disclosed embodiments. As shown in FIG. 1, reconfigurable data processing platform 101 may include one or more reconfigurable universal data processing module 102, a configuration memory 103, and a reconfiguration control unit 104. Other components may also be included.

Reconfigurable universal data processing module 102 may be regularly formed by a plurality of basic units 105 to process digital data. A basic unit, as used herein, may refer to a general circuit block, formed by a plurality of gates and related circuit connections, capable of being configured to perform a unit of logic and/or arithmetic operation or a unit of data processing operation. The basic unit may be substantially simpler than a central processing unit in a general purpose processor but substantially more complex than a single gate in an FPGA, yet the basic unit is sufficiently generic to be used to form a building block of more complete logic and/or arithmetic operation unit. A small number of types of basic units may be included in the reconfigurable universal data processing module 102.

Further, the reconfigurable universal data processing module 102 may include axis-asymmetrical pre-set interconnections for connecting the plurality of basic units 105 to achieve certain specific functions and can be reconfigured by configuring the configuration memory 103. Configuration memory 103 may include a plurality configuration memory cells or units for storage and data reordering and for configuring structures within reconfigurable universal data processing module 102. Further, reconfiguration control unit 104 may provide control signals for configuration memory 103 and reconfigurable universal data processing module 102. The reconfiguration control unit 104 can independently generate control signals or to work with other devices to realize the reconfiguration logic, including reconfigurable universal data processing module 102 and configuration memory 103.

The reconfigurable universal data processing module 102 may be formed by a large number of one-bit basic operation units of the same type and a small number of operation units of different types, all being called as basic units 105. The basic operation units are connected regularly by interconnection structures, such as the axis-asymmetrical pre-set interconnections. The basic operation units can be configured and reconfigured to implement certain functions by setting the configuration memory 103. Further, reconfigurable universal data processing module 102 can be separated into one or more digital data processors, each corresponding to a different function according to the configuration. The smallest digital data processor may be a single basic unit, and certain digital data processor may include a plurality basic units. Thus, the reconfigurable universal data processing module 102 can implement one or more algorithms simultaneously. Although the reconfigurable universal data processing module 102, the configuration memory 103, and the reconfiguration control unit 104 are shown as separate devices, they may overlap or coincide with one another.

The basic operation unit or basic unit can be configured to complete a 1-bit logic operation and a 1-bit addition operation. A plurality of basic units can then be configured to form a row of basic units to realize multiple-bit logic and arithmetic operations that cannot performed by a single basic unit, such as addition, subtraction, and shifting, etc. The row of basic units may be a physical row of the basic units interconnected or a logic row without physical restrictions. Further, a plurality of rows can be configured to form an array of basic units to realize particular functionalities that cannot be performed by a single row of basic units, such as shifting, multiplication, multiplication-addition, multiplication-subtraction, saturation, extraction, absolute value, and rounding.

Figure 2:
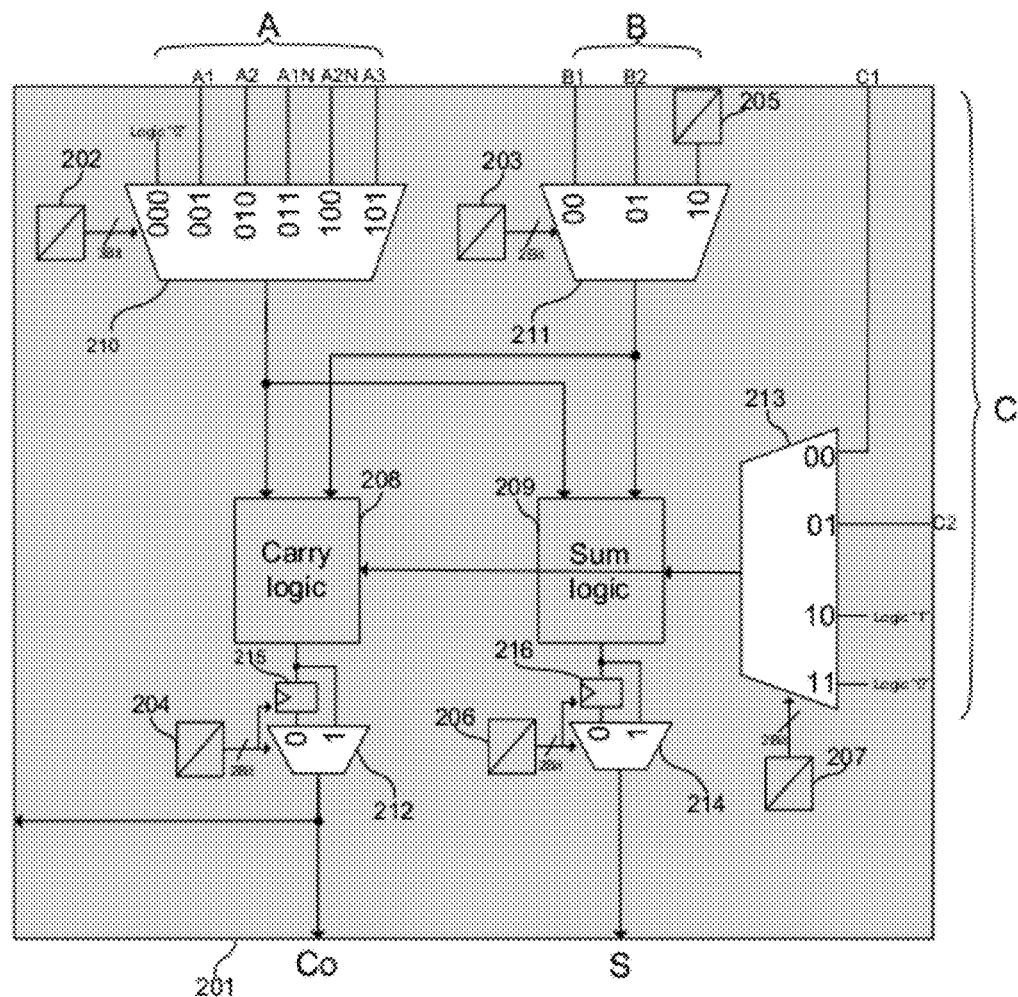
FIG. 2 illustrates an exemplary basic unit consistent with the disclosed embodiments.

FIG. 2 illustrates an exemplary operation basic unit consistent with the disclosed embodiments. As shown in FIG. 2, basic unit 201 includes three sets of data input ports A, B, and C, and two sets of data output ports Co and S. Basic unit 201 also includes multiplexer 210, multiplexer 211, multiplexer 213, carry logic 208, sum logic 209, multiplexer 212, and multiplexer 214. Certain devices may be omitted and other devices may be included.

Port A may include a group of six inputs, logic "0", input A1, input A2, input A1N, input A2N, and input A3. Inputs A1, A2, A1N, and A2N may be used as partial product inputs in a multiplication operation, or global inputs in other functional operations. The six inputs are provided to multiplexer 210 (e.g., a six-to-one selector) and one input may be selected as an actual input to carry logic 208 and sum logic 209. The multiplexer 210 is controlled by configuration memory cell 202.

Port B may include a group of three inputs, input B1, input B2, and configuration memory cell 205, all of which are provided to the multiplexer 211 (e.g., a three-to-one selector). One input may be selected as an actual input to carry logic 208 and sum logic 209, and the multiplexer 211 is controlled by configuration memory cell 203. Further, port C may include a group of four inputs, input C1, input C2, logic "1", and logic "0". The four inputs are provided to multiplexer 213 (e.g., a four-to-one selector) and one input may be selected as an actual input to carry logic 208 and sum logic 209. The multiplexer 213 is controlled by configuration memory cell 207.

Carry logic 208 may include circuitry to calculate a carry output based on the inputs from multiplexers 210, 211, and 213, and sum logic 209 may include circuitry to calculate a sum output of the inputs from multiplexers 210, 211, and 213. Further, multiplexer 212 (e.g., a two-to-one selector) may be used to select to output the carry output directly from carry logic 208 or from register 215, which stores a previous carry output from carry logic 208 and is controlled by configuration memory cell 204. The selected carry output may be outputted on output port Co (with different output directions). Similarly, multiplexer 214 (e.g., a two-to-one selector) may be used to select to output the sum output directly from sum logic 209 or from register 216, which stores a previous sum output from sum logic 209 and is controlled by configuration memory cell 206. The selected sum output may be outputted on output port S.

Figure 3A:
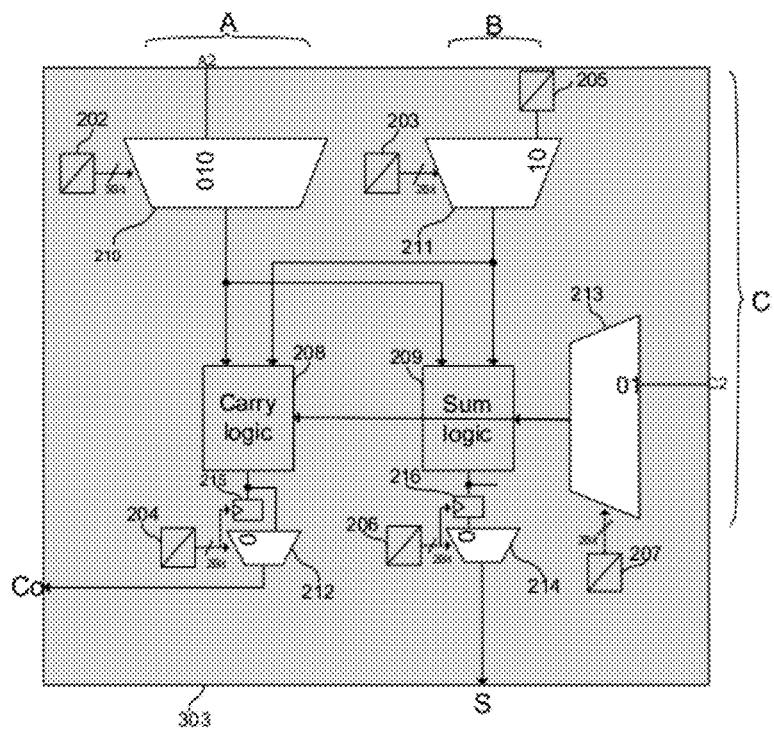
FIG. 3A illustrates an exemplary configuration of basic unit to implement a general addition operation consistent with the disclosed embodiments.

FIG. 3A illustrates an exemplary configuration of basic unit to implement a general addition operation. As shown in FIG. 3A, multiplexer 210 is controlled by configuration memory cell 202 to select A2 as the actual input from port A; multiplexer 211 is controlled by configuration memory cell 203 to select configuration memory cell 205 as the actual input from port B; and multiplexer 213 is controlled by configuration memory cell 207 to select C2 as the actual input from port C. Further, configuration memory cell 206 is configured to control multiplexer 214 to select a sum output stored in register 216 as output S of basic unit 303, and configuration memory cell 204 is configured to control multiplexer 212 to select a carry output stored in register 215 as output Co of basic unit 303. The inputs on port B can also from external or global signal lines. Thus, the basic unit is configured as a 1-bit full adder.

Figure 3B:
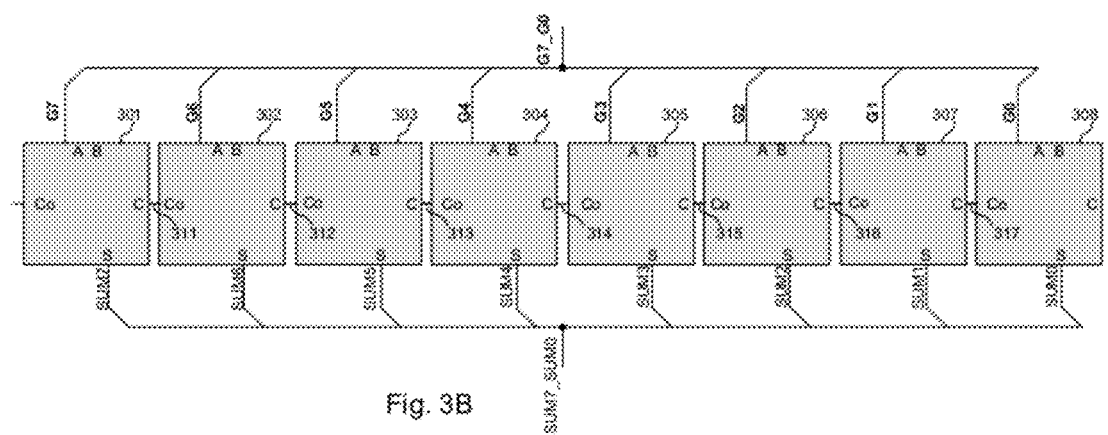
FIG. 3B illustrates an exemplary interconnection of an 8-bit adder consistent with the disclosed embodiments.

FIG. 3B illustrates an exemplary interconnection of an 8-bit adder implemented by a plurality of basic units of 1-bit full adders. As shown in FIG. 3B, basic units 301-308 are connected in a sequence, each basic unit corresponding to one bit in the 8-bit addition operation. Inputs on port A of all basic units may be from a group of signals G7-G0 of a non-adjacent row; and inputs on group B of all basic units may be from corresponding configuration memory cells 205. Further, through connections 311-317, output Co from an individual basic unit (basic unit 302, 303, 304, 305, 306, 307, or 308) is coupled to input C of a corresponding left-side basic unit to form a carry chain, and the carry chain can contain look-ahead carry logic. The outputs S of basic units 301-308 form outputs SUM0-SUM7 as the sum of an 8-bit adder. Further, through certain configuration of the configuration memory cell 207, the carry chain can be separated into several parts to achieve a single instruction stream multiple data stream (SIMD) addition instruction.

In addition, the interconnection used by reconfigurable universal data processing module 102 (e.g., adder) may include various types of interconnections, such as high-speed local interconnects and global buses. The high-speed local connections are provided or pre-set between the basic units for adjacent high-speed connections. Such local interconnections may be hard-wired high-speed local connections within short distances and may be used for delay-critical paths. The interconnections between basic units can be reconfigured by configuring the multiplexers in the basic units and may be applied to form the carry chain in addition and subtraction operations and to partial products accumulation paths in multiplication operation, such as in adders, subtractors, and multipliers, etc.

On the other hand, the global bus lines (e.g., global input lines), including vertical lines and horizontal lines for connecting rows of basic units or arrays of basic units. The vertical bus lines may be used to pass data vertically among the rows or arrays, and the horizontal bus lines may be used to shift data among horizontally configured rows or arrays. Interconnections in other directions can also be implemented using the vertical and horizontal global bus lines.

Figure 4A:
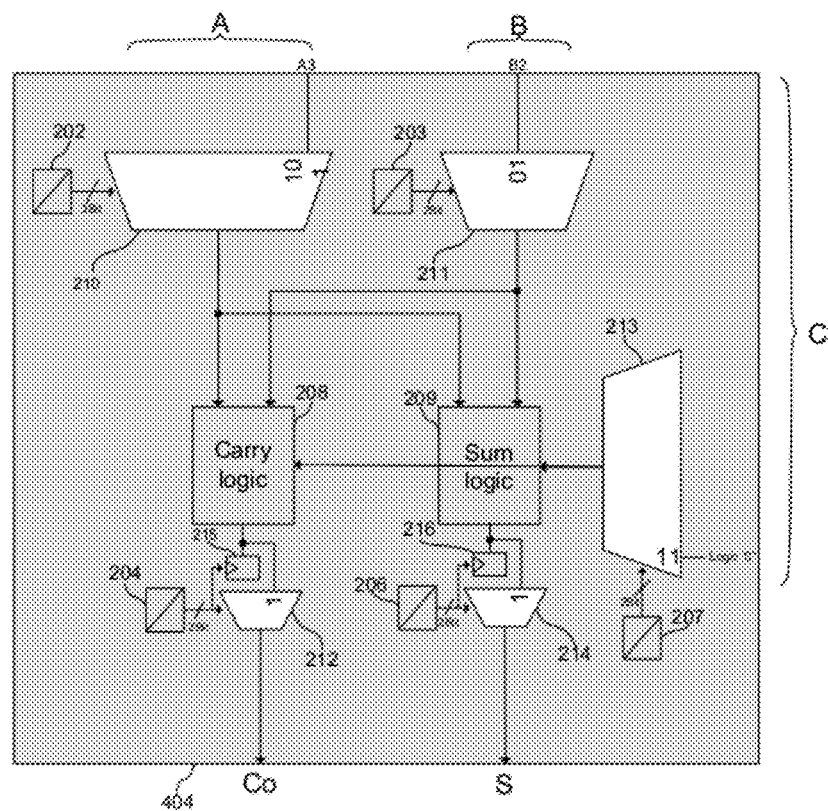
FIG. 4A illustrates an exemplary configuration of a basic unit to implement a logic operation consistent with the disclosed embodiments.

FIG. 4A illustrates an exemplary configuration of a basic unit to implement a logic operation. As shown in FIG. 4A, multiplexer 210 is controlled by configuration memory cell 202 to select A3 as the actual input from port A; multiplexer 211 is controlled by configuration memory cell 203 to select B2 as the actual input from port B; and multiplexer 213 is controlled by configuration memory cell 207 to select Logic '0' as the actual input from port C. Further, configuration memory cell 206 is configured to control multiplexer 214 to select a sum output directly from sum logic 209 as output S of basic unit 404, and configuration memory cell 204 is configured to control multiplexer 212 to select a carry output directly from carry logic 208 as output Co of basic unit 404. Thus, the output S of the basic unit is a result of a logic exclusive OR of input A and input B, and the output Co is a result of a logic AND of input A and input B.

Figure 4B:
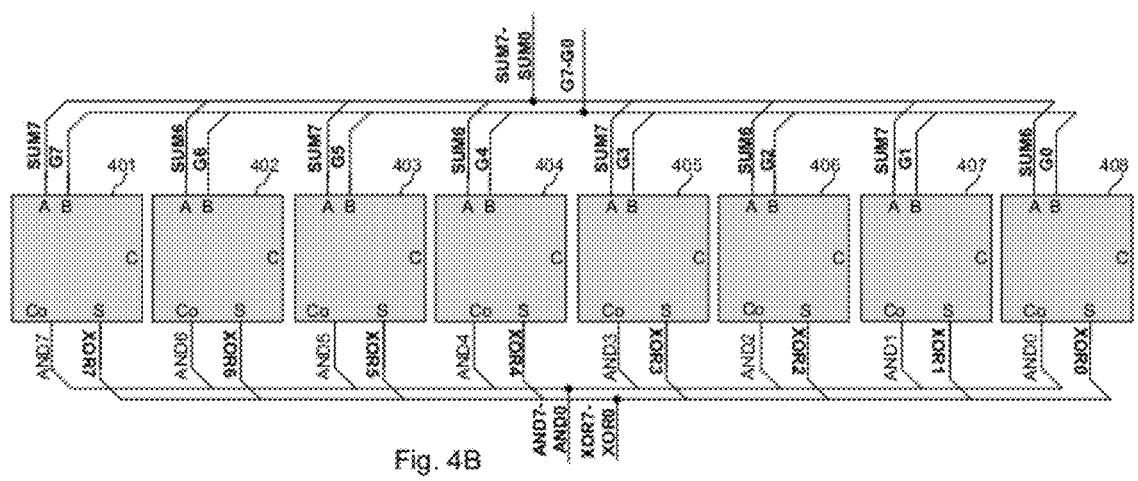
FIG. 4B illustrates an exemplary interconnection of an 8-bit logic unit consistent with the disclosed embodiments.

FIG. 4B illustrates an exemplary interconnection of an 8-bit logic unit implemented by a plurality of basic units. As shown in FIG. 4B, each of basic unit 401-408 corresponds to one bit in the 8-bit logic operation. Inputs on port A of all basic units 401-408 may be from SUM7-SUM0 of a previous 8-bit adder operation, and inputs on port B of basic units 401-408 may be from a group of signals G7-G0 of a non-adjacent row. Further, the outputs S of basic units 401-408 form outputs XOR7-XOR0 as the XOR of inputs A and inputs B, and the outputs Co of basic units 401-408 form outputs AND7-AND0 of inputs A and inputs B.

Figure 5:
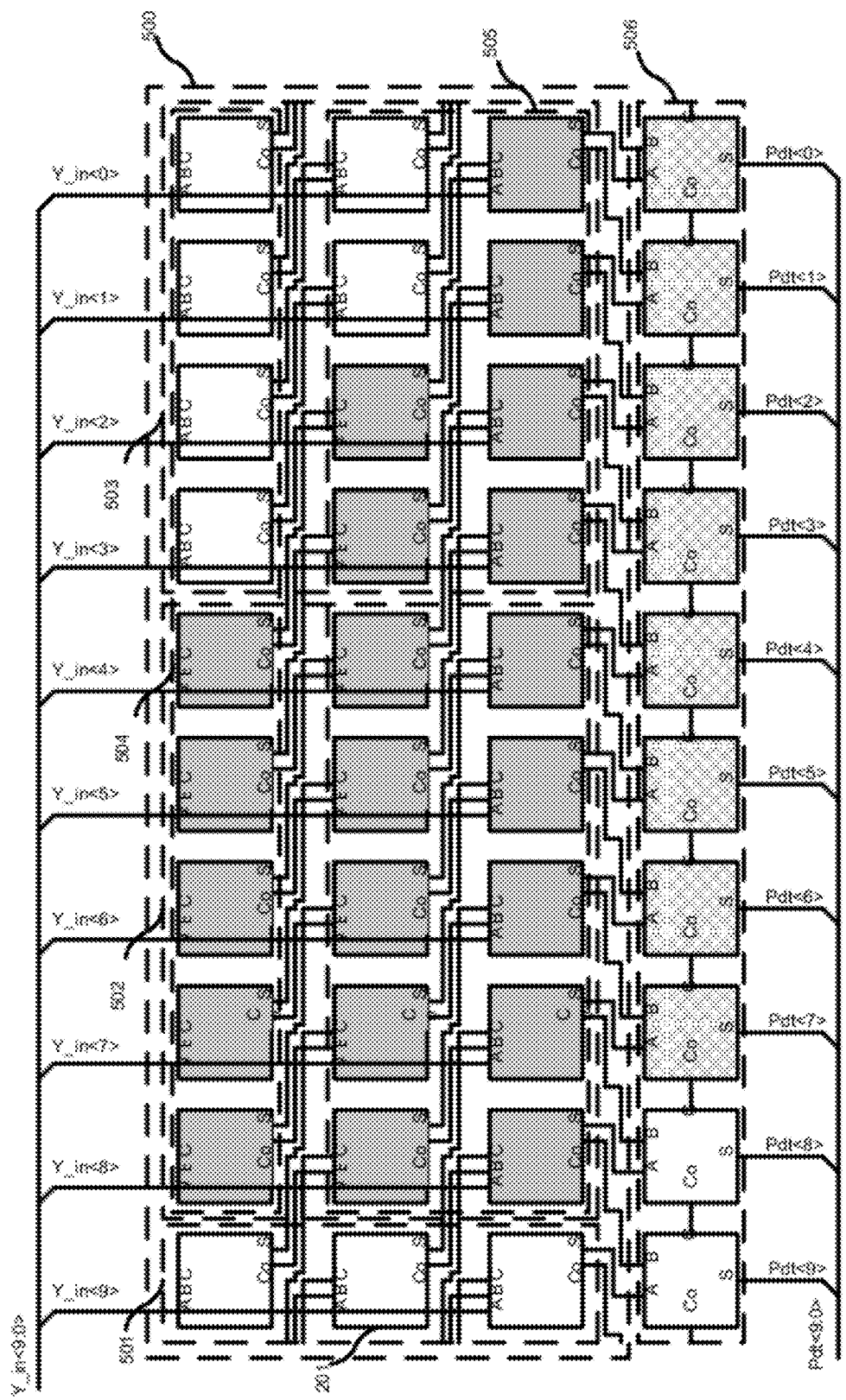
FIG. 5 illustrates an exemplary 4-bit multiplication unit consistent with the disclosed embodiments.

FIG. 5 illustrates an exemplary 4-bit multiplication unit consistent with the disclosed embodiments. As shown in FIG. 5, the multiplication unit includes a partial product part 500 and a summation part 506, both part 500 and part 506 includes a plurality of basic units 201. The interconnections among the basic units are shown for illustrative purposes and certain interconnections are omitted. With the 4-bit multiplication unit, different multiplicands are provided to the multiplier, while multiplier may be relatively fixed (e.g., coefficients).

An encoder (e.g., a Booth encoder) may be provided to encode inputting operands within the multiplication unit (i.e., reconfigurable universal data processing module 102) or the encoder may be configured using a certain number of basic units. The results from the encoder may be provided to the multiplication unit as inputs or as coefficients pre-stored in the configuration memory 103. After the multiplier is Booth-encoded, each partial product generated on certain weighted bits has a relatively stable relationship with the multiplicand, e.g., being ±2 times of the multiplicand, ±1 times of the multiplicand, or 0. Thus, the 4-bit multiplication unit can effectively reduce the number of partial products to improve operational efficiency.

In operation, for an m-bit and n-bit multiplication operation Ym×Xn, using a Radix2 Booth encoding method, partial products can be compressed using a linear array into two partial sum, which can be provided to a full adder with carry to generate a final result. The size of the linear array may be determined based on whether the operands are signed (i.e., plus or minus). In a signed operation, a total number of N/2 rows of basic units 201 may be needed, where N is the smallest even number not less than n. On the other hand, in an unsigned operation, a total number of N/2+1 rows of basic units 201 may be needed, where N is the smallest even number greater than n. In both signed operation and unsigned operation, a total number of m×2+2 columns of basic units 201 may be needed. Further, the adder for generating the final result may need a single row of a total number of m+n basic units 201. Because high bits (e.g., most significant bits) of an unsigned number can be zero-extended to become a signed number, whether to distinguish operations between the signed or unsigned numbers can be flexibly determined based on particular applications.

For example, for a Y4×X4 4-bit signed multiplication, the part 500 includes a total number of (6/2) 3 rows of basic units 201 and a total number of (4×2+2) 10 columns of basic units 201. Thus, the linear array is a 3×10 basic unit array to complete the partial product compression.

More particularly, in operation, the multiplicand Y is sign-extended for two highest bits, and then 4 low bits of "0" are appended to the multiplicand Y. Thus, the multiplicand Y can be expressed as a 10-bit number of Y_in <9:0>. The Y_in <9:0> and Y_in <9:0> left-shifted by 1 bit, and their logic complements correspond to the port A input A1, A2, A1N, and A2N, respectively, of basic units 201 in the linear array 500.

Further, various input ports of the plurality of basic units 201 are appropriately configured to realize correct logic for multiplication operations. For port A: configuration memory cell 202 is configured using configuration information determined based on Radix2 Booth encoding of multiplier X, selecting corresponding partial products to be 0, +1 times the multiplicand, −1 times the multiplicand, +2 times the multiplicand, and −2 times the multiplicand to be inputted as input signals 0, A1, A2, A1N and A2N of port A via multiplexer 210. Further, the partial products are provided to the summation operation after passing through specific logic. Ports A of basic units of section 501 are configured to implement logic to perform sign extension of the partial products, ports A of basic units of section 502 are configured to generate the correct partial products, and ports A of basic units of section 503 are configured to be logic "0" to ensure correct multiplication result from low bits (e.g., least significant bits).

Further, for port B: configuration memory cell 203 is also configured using appropriate configuration information. Ports B of basic units of section 501 are configured to be logic "1" to achieve sign extension of the partial products. Section 504 is the beginning row of basic units of the multiplication operation, and ports B of basic units of section 504 are configured to implement logic for performing logic complement during the partial product generation process, including part of the sign extension logic. Further, ports B of section 505 are configured to select output port C of previous level (or previous row) basic units 201 right-shifted by one bit to achieve alignment and accumulation of partial products.

For port C: configuration memory cell 207 is configured using appropriate configuration information. Ports C of basic units of section 501 are configured the same as ports B, being set to logic "1" to achieve sign extension of the partial products. Ports C of basic units of section 504 are configured to logic "0". Further, ports C of basic units of section 505 are configured to connect with corresponding outputs S of previous level (or previous row) basic units to select S outputs right-shifted by two bits to achieve alignment and accumulation of partial products. The high bits of the outputs S (e.g., most significant bits) are filled with logic "0" during right-shifting.

Thus, through the above configurations, the last level (or last row) of basic units can generate two partial sums, which, after being aligned, are provided to the adder 506 to generate the final result by adding the two partial sums. Basic units of adder 506 are also appropriately configured to implement specific logic. For port A: configuration memory cell 202 is configured to connect to output C of a previous level basic units left-shifted by one bit to achieve alignment and cumulative of the partial sums. For port B: configuration memory cell 203 is configured to connect to output S of the previous basic units. Further, for port C: configuration memory cell 207 of a basic unit is configured to connect to output Co of a low-bit basic unit at the same level or row to form a carry chain of the full adder 506.

Thus, a 10-bit sum Pdt<9:0> can be generated on the output S. The two highest bits of the 10-bit sum are sign extension and may be discarded to obtain the final 8-bit multiplication result Pdt <7:0>. For the lowest 4 bits of the multiplication result Pdt <3:0> may be included or discarded based on particular applications.

Figure 6:
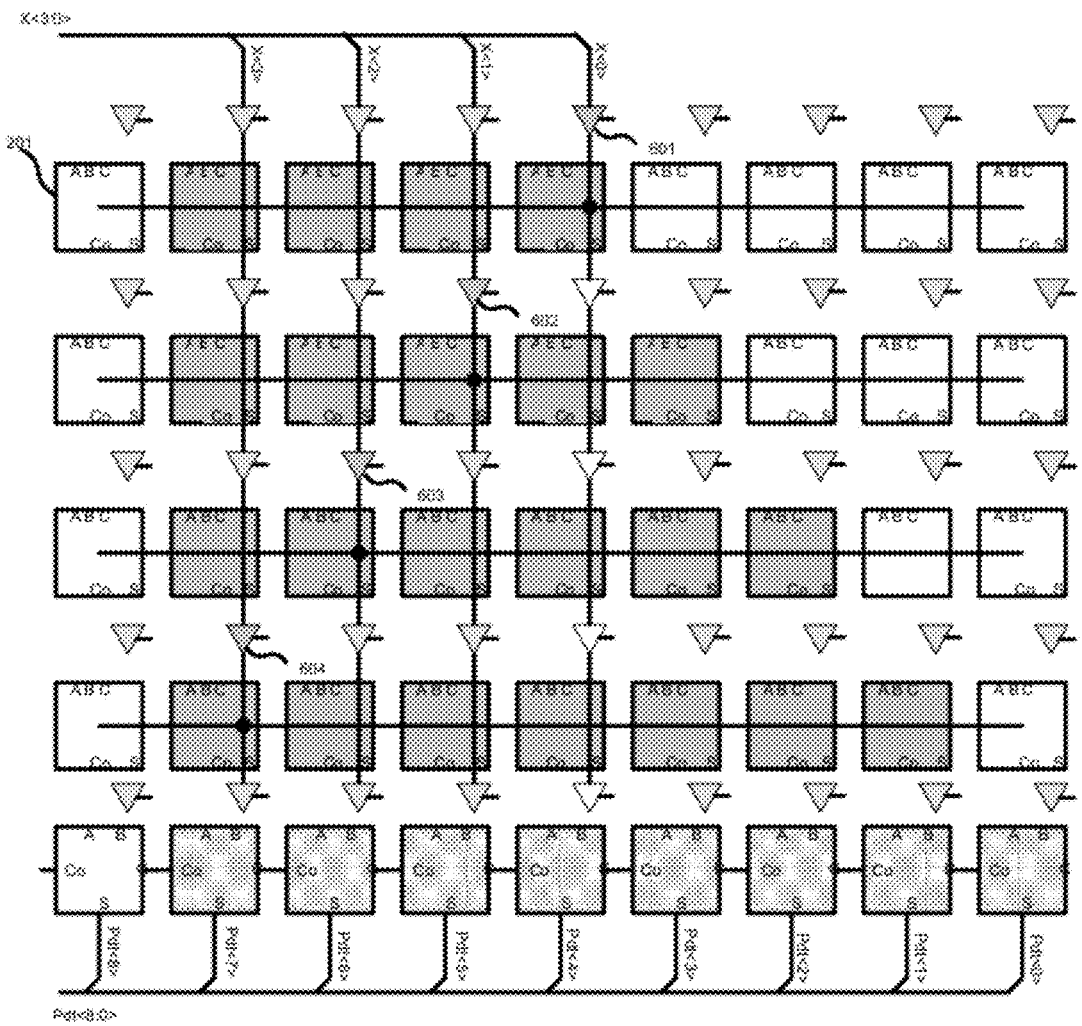
FIG. 6 illustrates an exemplary general multiplication unit consistent with the disclosed embodiments.

However, if the two operands (the multiplier and the multiplicand) both change during the multiplication operation, the above multiplication unit comprising the linear array 500 and adder 506 may be less efficient due to the above ways to generate the configuration information. A general multiplication unit may also be implemented based on the basic units to perform multiplication operations with changing multipliers and multiplicands. FIG. 6 illustrates an exemplary general multiplication unit.

As shown in FIG. 6, again, a 4-bit signed multiplication is used as an example. Different from the multiplication unit shown in FIG. 5, here the partial products are no longer determined based on the Booth-encoded multiplier X by setting the configuration information of configuration memory cell 202 in basic units 201. Rather, the multiplier X is directly placed on a three-state gate controlled bus to select partial products (FIG. 6 only shows the control line interconnection of the three-state gate for illustrative purposes). Because the Booth encoding is not performed, when the partial products are added together into an intermediate result to be right-shifted, the number of bits of the intermediate result is one less than the multiplication unit shown in FIG. 5. The signed extension and port configurations are similarly performed to these of the multiplication unit shown in FIG. 5. The three-state gate controlled bus may be set by the following steps: using corresponding bits of multiplier X via three-state gates 601, 602, 603, and 604 to respectively control the partial products to be 1 times the multiplicand (which may be followed by logic performing complement operation, and the logic complement may appear in the last partial product) or to be logic '0'. Further, an intermediate partial product may be right-shifted to be added to a partial product from a previous level or row of basic units, and such addition is repeated to generate the final product Pdt.

In addition, different multiplication units may be configured flexibly according to specific circumstances such as the types of the multiplication operation, different bit-width of the data, and whether there is an SIMD instruction, etc. For example, FIGS. 7A and 7B illustrate an exemplary configuration for realizing the SISD and SIMD instructions using similar width data channels.

Figure 7A:
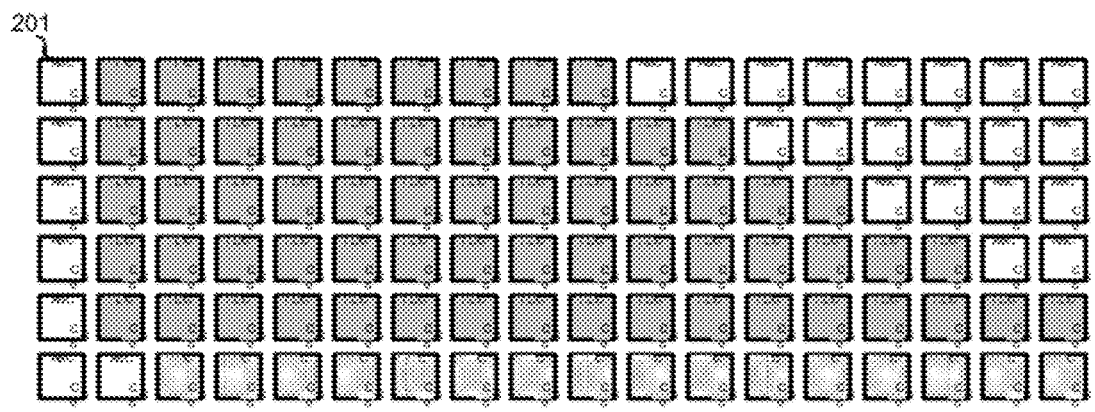
FIGS. 7A-7B illustrates an exemplary configuration for realizing the SISD and SIMD instructions consistent with the disclosed embodiments.

As shown in FIG. 7A, an 8-bit multiplication unit is implemented using a structure similar to the 4-bit multiplication unit shown in FIG. 5. The result of the 8-bit multiplication is 16 bits, the width of the data channel for the entire operation is 18 bits, and the height of the multiplication unit is 6 rows. A data channel, as used herein, may refer to a collection of basic units with a specified height and width and associated interconnections.

Figure 7B:
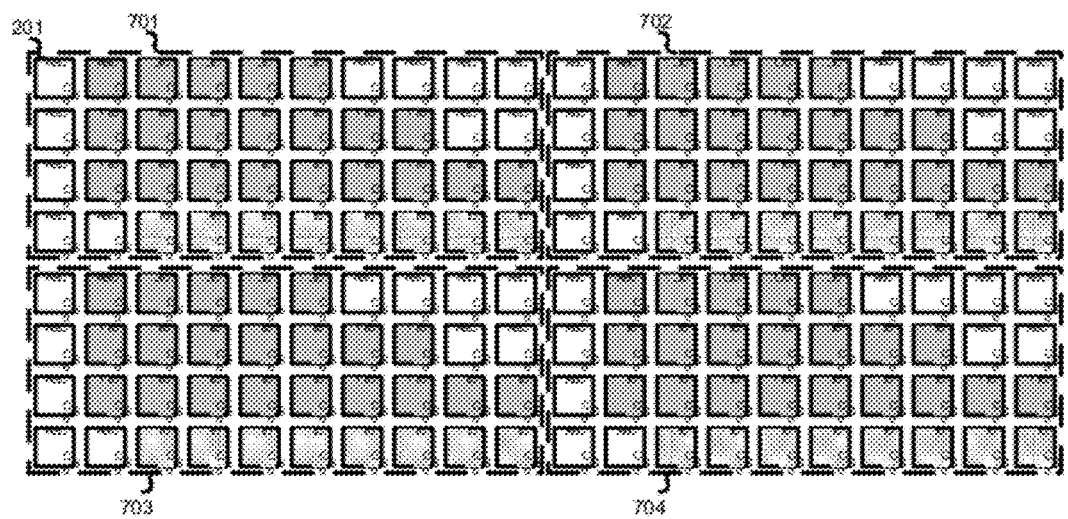

As shown in FIG. 7B, a total number of four multiplication units 701, 702, 703, and 704 are implemented with a 20-bit wide and 8-row high data channel by separating and reconfiguring the data channel. Each of multiplication units 701, 702, 703, and 704 has a width of 10 bits and a height of 4 rows. The four multiplication units may then be used to generate four 8-bit multiplication operation results to be used in later stage operations.

FIG. 8 illustrates an exemplary configuration for floating-point multiplication operations. A floating point multiplication operation is divided into operations for three parts: the sign bit, the exponent, and the mantissa. The sign bit of a product of the floating point multiplication is a logic XNOR of the two sign bits of the two operands, the exponent of the product is a sum of the two exponents of the two operands, and the mantissa of the product is a product of the two mantissa of the two operands.

As shown in FIG. 8, the data channel is separated horizontally into functional modules of sign operation unit 801, exponent operation unit 802, and mantissa operation unit 803, etc. Sign operation unit 801 is configured to achieve the XNOR logic to complete sign operation. Before units 802 and 803 reach final operational results, the result of sign operation can be passed through different levels. Further, exponent operation unit 802 is configured as an adder to complete addition operation of the two exponents. Before unit 803 reaches a final operation result, the result of addition operation can be passed through different levels. Mantissa operation unit 803 is configured as a multiplication unit to complete an unsigned multiplication operation to generate the product of the two mantissas. After the results of the units 801, 802, and 803 are generated, the results can be outputted to obtain the final result of the floating-point multiplication.

The precision of the mantissa of the product of the floating point multiplication can be set by a user, and section 804 can be configured to generate the final result of the floating-point multiplication. The width of the final result is the same as the width of the mantissa of the operands. However, the multiplication of two operands may increase the width of the product. Thus, the resulted mantissa of the floating-point multiplication may be processed to reduce the width of the mantissa by using various methods, such as removing tailing bits, rounding to the next digit, or general rounding, etc. Further, when implementing these methods, such as general rounding, section 805 may be configured accordingly. For example, configuration memory cell 203 may be configured to set the input on port B as logic "1".

Figure 9:
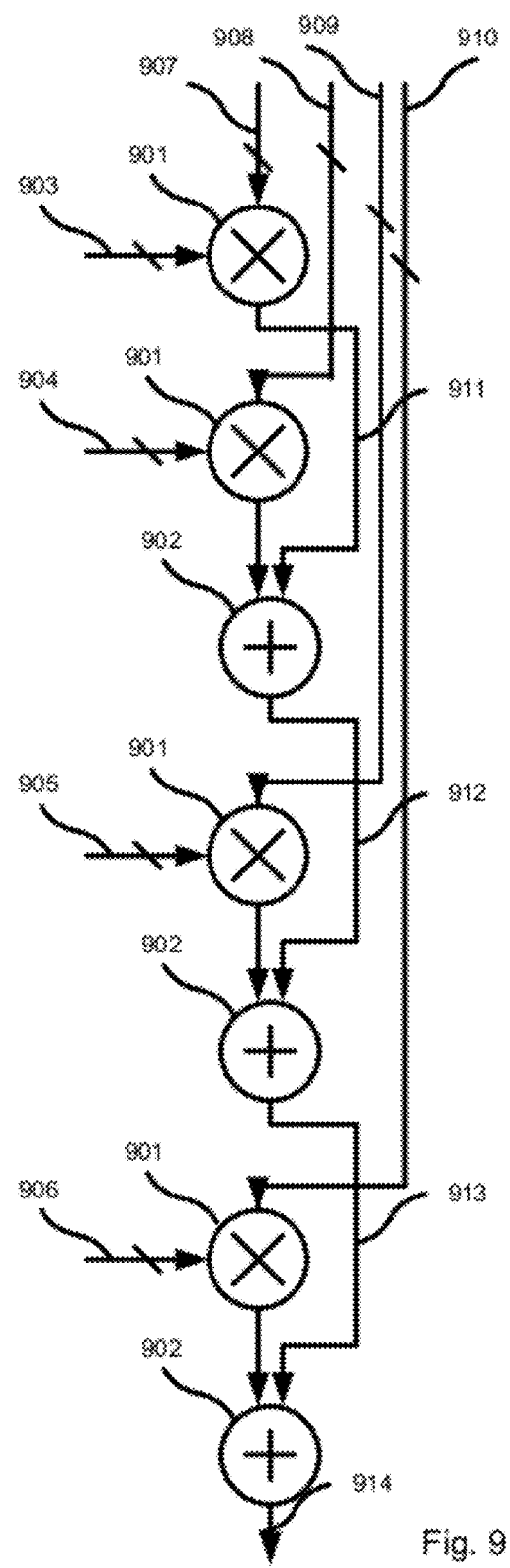
FIG. 9 illustrates an exemplary configuration for a multiplication-addition unit consistent with the disclosed embodiments.

FIG. 9 illustrates an exemplary configuration for a multiplication-addition unit. As shown in FIG. 9, multiplication unit 901 may have the same structure as the multiplication unit shown in FIG. 5, and adder 902 may have the same structure as the adder shown in FIGS. 3A and 3B. A plurality of multiplication units 901 and adders 902 may be interconnected and configured to complete multiplication-addition operations. For example, configuration control lines 903-906 are provided for inputting one operand of the multiplication-addition operation, and global buses 907-910 are provided for inputting the other for operand of the multiplication-addition operation. Further, global buses 911, 912, and 913 are provided to pass intermediate results of the multiplication operation and addition operation to achieve d the multiplication-addition operation. Based on the number of continuous multiplication-addition operations, the width of the multiplication units can be configured such that no overflow occurs during summation of the intermediate results and in the final result. Assuming that operands inputted on 903-910 are X, Y, Z, W, a, b, c, and d, respectively, then the multiplication-addition unit performs four multiplication operations as aX, bY, cZ, and dW, and three addition operations to add the four products in sequence. The final result is provided by the 914 output the final result:

aX+bY+cZ+dW

To more effectively use the reconfigurable data channel, the multiplication operands inputted on the configuration control lines, X, Y, Z, and W, may be a group of relatively fixed numbers, such as a set of coefficients. Further, the multiplication-addition unit may be used to implement vector multiplication.

$$[a\ b\ c\ d] \cdot \begin{bmatrix} X \\ Y \\ Z \\ W \end{bmatrix} = [aX + bY + cZ + dW]$$

where [a b c d] and $$\begin{bmatrix} X \\ Y \\ Z \\ W \end{bmatrix}$$

are two vectors, and the values of X, Y, Z, and W are set as relatively fixed numbers.

The multiplication-addition unit may also be used to implement matrix and vector multiplication, and a matrix and vector multiplication may comprise a number of vector multiplications. For example, $$\begin{bmatrix} a0 & b0 & c0 & d0 \\ a1 & b1 & c1 & d1 \\ a2 & b2 & c2 & d2 \\ a3 & b3 & c3 & d3 \end{bmatrix} \cdot \begin{bmatrix} X \\ Y \\ Z \\ W \end{bmatrix} = \begin{bmatrix} a0X + b0Y + c0Z + d0W \\ a1X + b1Y + c1Z + d1W \\ a2X + b2Y + c2Z + d2W \\ a3X + b3Y + c3Z + d3W \end{bmatrix}$$

Where $$\begin{bmatrix} a0 & b0 & c0 & d0 \\ a1 & b1 & c1 & d1 \\ a2 & b2 & c2 & d2 \\ a3 & b3 & c3 & d3 \end{bmatrix}$$

is a matrix.

The four elements of the final result or final matrix can all be obtained through four multiplication operations and three addition operations. Thus, the four elements can be calculated and outputted in sequence to achieve matrix and vector multiplication. Similarly, matrix and matrix multiplication can also be implemented by using the multiplication-addition unit.

Figure 10A:
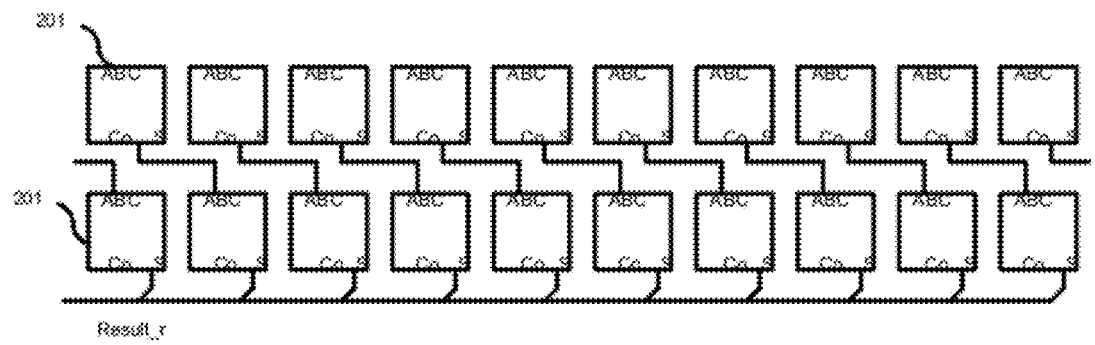
FIGS. 10A-10B illustrates an exemplary configuration for a shifter consistent with the disclosed embodiments.
Figure 10B:
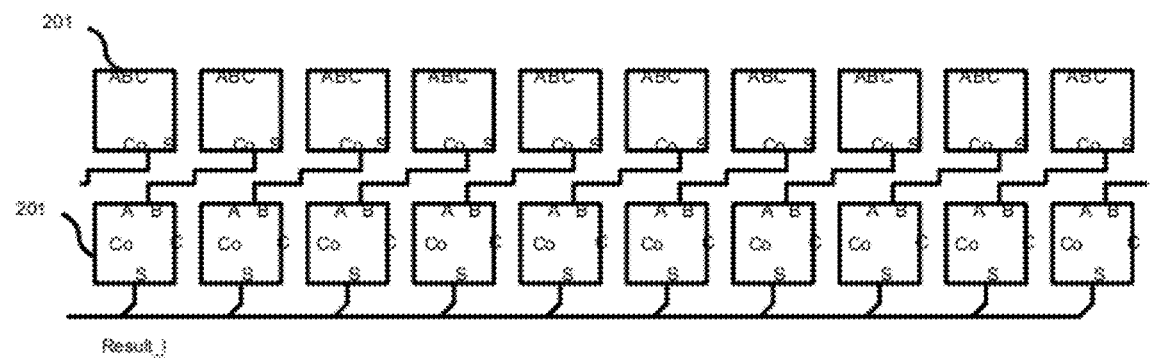

FIGS. 10A and 10B illustrate an exemplary configuration for a shifter. As shown in FIG. 10A, two rows or levels of plurality of basic units 201 are configured to form a right-shifter, and in FIG. 10B, two rows or levels of plurality of basic units 201 are configured to form a left-shifter. In both FIG. 10A and FIG. 10B, the Co output of a basic unit 201 from the first level is configured to connect port B input of a corresponding basic unit 201 from the second level. For the first level basic units, port A inputs of the basic units 201 from the first level are provided as the shifting operand; port B inputs are configured by configuration memory cell 202 to be logic "1"; and port C inputs are configured by configuration memory cell 207 to be logic "0". For the second level basic units, port B inputs are configured by configuration memory cell 202 to take inputs Co of the corresponding basic units from the first level, and configured to generate shifted result Result_r for right-shifting operation and Result_l for left-shifting operation.

After the shifting, if a further operation requires an operand inputted on port A from basic units 201 on the first level, then the basic units 201 of the second level can be configured to set logic "0" to both port A and port C to keep the shifting result on output S, which can be further provided to other basic units as input.

Figure 11A:
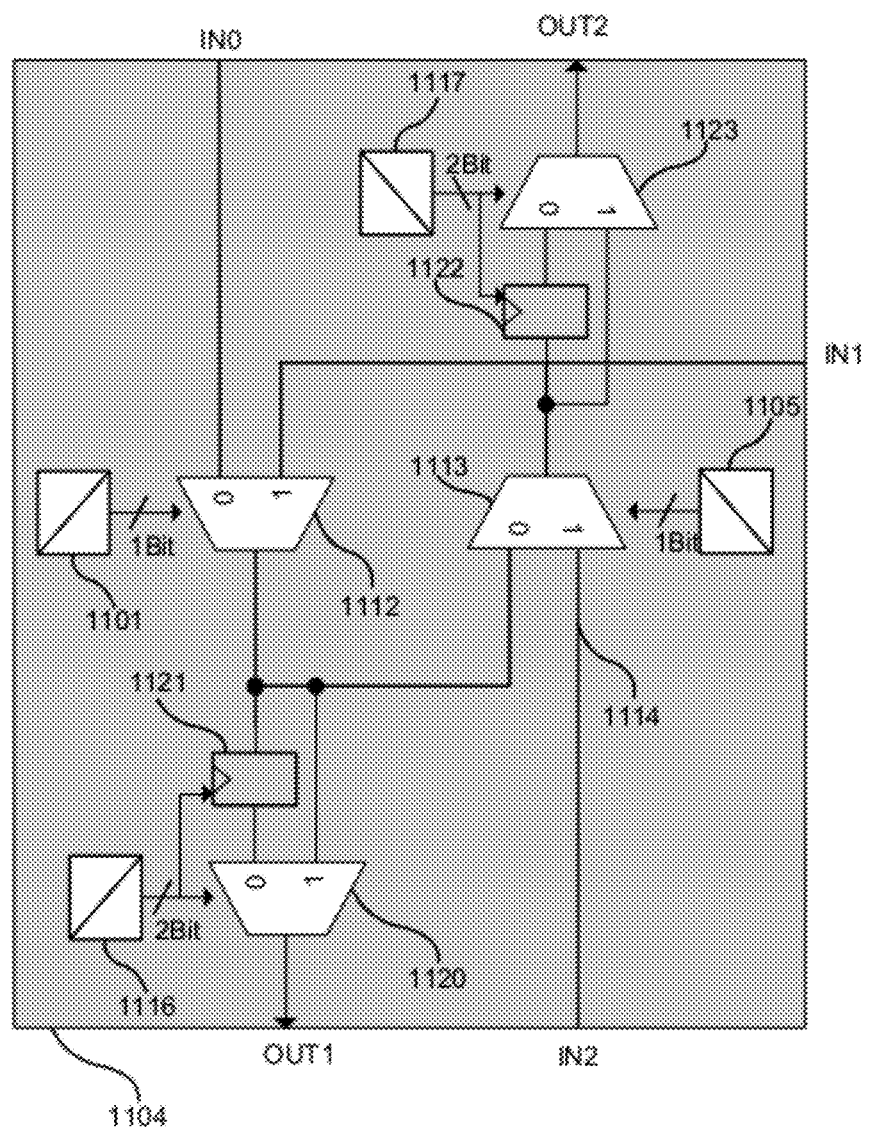
FIG. 11A illustrates an exemplary basic unit for vertical data processing consistent with the disclosed embodiments.

FIG. 11A illustrates an exemplary basic unit for vertical data processing. As shown in FIG. 11A, basic unit 1104 may include inputs IN0, IN1, and IN2, and outputs OUT1 and OUT2. IN0 may be from an output of an above basic unit or a basic unit output, IN1 may be a global input, and IN2 may be from an output of a below basic unit or a basic unit output. Multiplexer 1112 (e.g., two-to-one selector) may be configured by configuration memory cell 1101 to select one of the basic unit output IN0 or the global input IN1 to pass down. Multiplexer 1120 (e.g., two-to-one selector) may be configured by configuration memory cell 1116 to select a stored value in register 1121 or a value directly from multiplexer 1112 as the output OUT1. Register 1121 is also controlled by the configuration memory cell 1116 whether to latch the output from multiplexer 1112.

Further, multiplexer 1113 (e.g., two-to-one selector) may be configured by configuration memory cell 1105 to select one of the basic unit output IN2 or the output from multiplexer 1112 (i.e., an internal feedback) to pass up. Multiplexer 1123 (e.g., two-to-one selector) may be configured by configuration memory cell 1117 to select a stored value in register 1122 or a value directly from multiplexer 1113 as the output OUT2. Register 1122 is also controlled by the configuration memory cell 1117 whether to latch the output from multiplexer 1113.

Figure 11B:
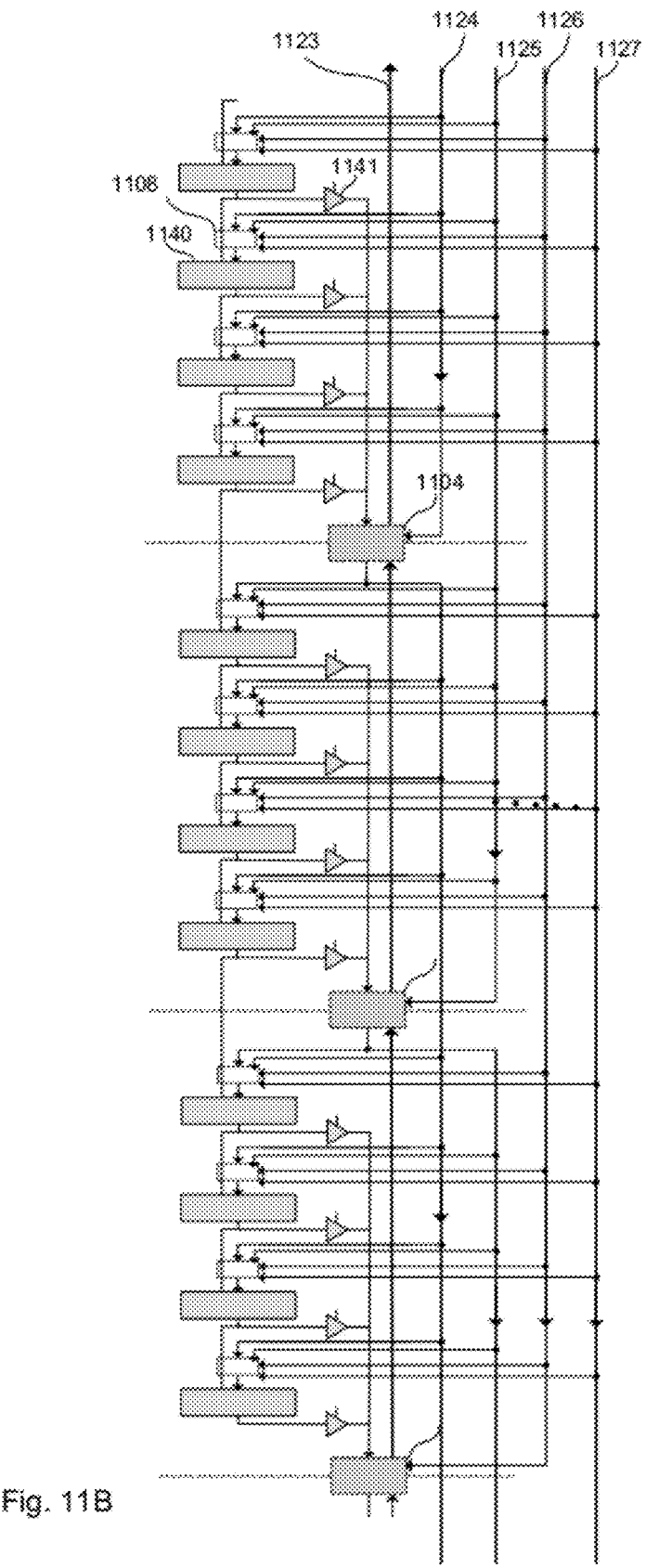
FIG. 11B illustrates an exemplary interconnection of the vertical data processing basic units consistent with the disclosed embodiments.

FIG. 11B illustrates an exemplary interconnection of the vertical data processing basic units. As shown in FIG. 11B, basic unit row 1140 may include a row of basic units, and four groups of downward buses 124-1127 are provided to pass down signals and one group of upward buses 1123 is provided to pass signals in a reverse direction. Multiplexer 1108 (e.g., four-to-one selector) is configured to select one of four groups as global inputs to a basic unit row 1140. Other inputs to the basic unit row 1140 may be from outputs of other basic rows. Outputs from four basic unit rows may be combined through tri-state gates 1141 as the IN0 input of the vertical basic unit 1104. The vertical basic unit 1104 may then be used to pass the signals vertically (e.g., upwards or downwards).

Figure 12A:
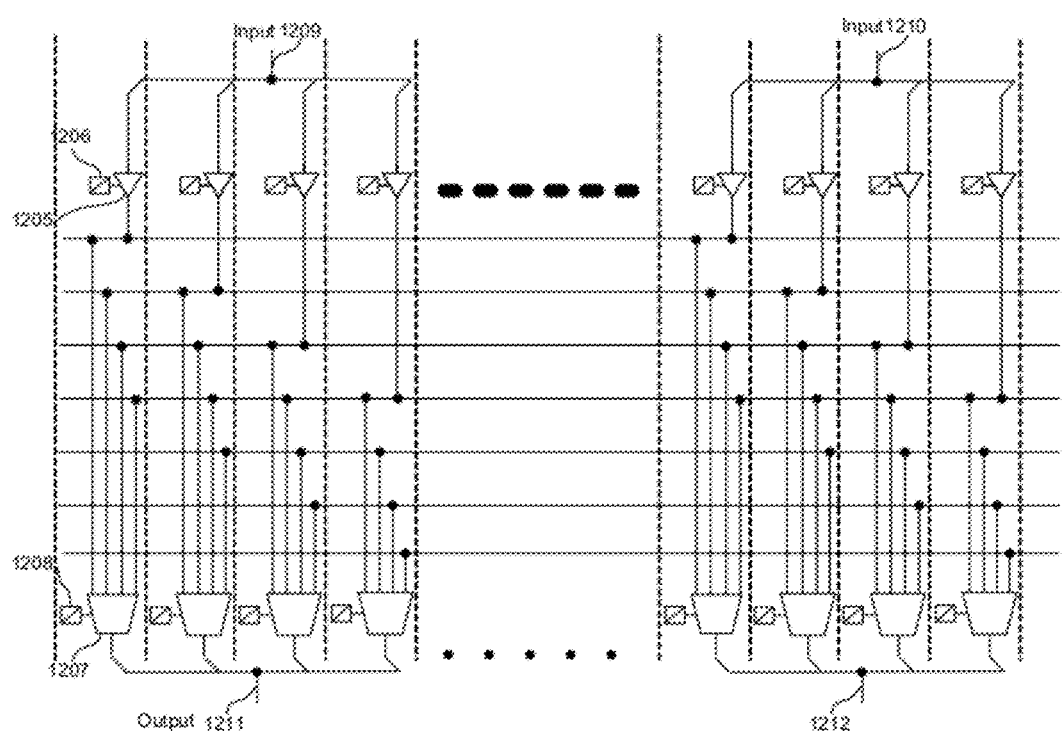
FIG. 12A illustrates an exemplary configuration for a horizontal shifting unit consistent with the disclosed embodiments.

FIG. 12A illustrates an exemplary configuration for a horizontal shifting unit. As shown in FIG. 12A, 4-bit signals from input 1209 and 1210 may form a single input signal with high bits and low bits or multiple input signals. The 4-bit signal is connected to corresponding tri-state gates 1205. Only one of the tri-state gates 1205 is open at any given time, and the tri-state gates 1205 are controlled by configuration memory cells 1206. Thus, multiplexer 1207 (e.g., four-to-one selector) can be used to implement shifting operation under the control of configuration memory cells 1208, such as overall left or right cyclic shifting operation, or to output signals from separate groups on entire group outputs 1211 and/or 1212.

Figure 12B:
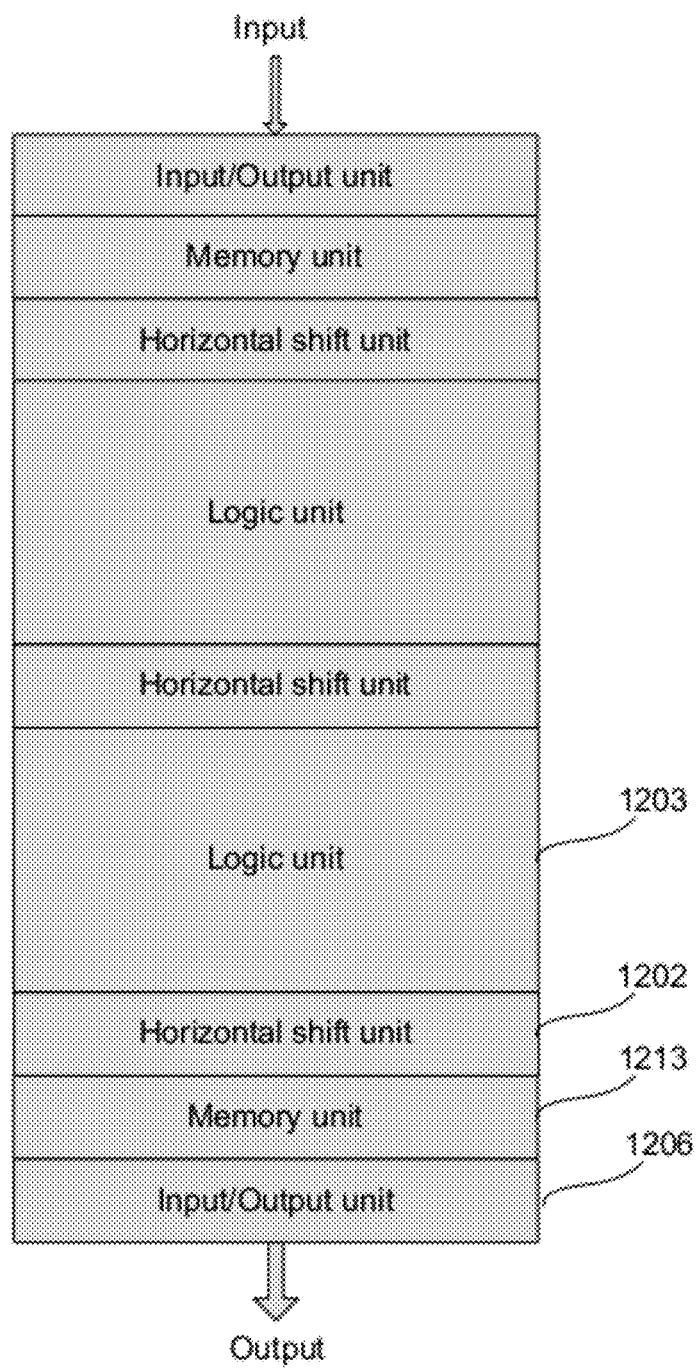
FIG. 12B illustrates an exemplary configuration of a universal data processing module consistent with the disclosed embodiments.

FIG. 12B illustrates an exemplary configuration of a universal data processing module. As shown in FIG. 12B, the universal data processing module includes one or more input/output unit 1206, one or more memory unit 1213, one or more horizontal shift unit 1202, and one or more logic unit 1203. The logical unit 1203 may be configured according to different functions and may be in the form of a row or an array. Horizontal shift unit 1202 may be used to shift signals horizontally as required.

FIG. 13A illustrates an exemplary un-configured reconfigurable universal data processing module. As shown in FIG. 13A, the reconfigurable digital signal processing block 1301 contains a plurality of basic units 1302.

FIG. 13B illustrates an exemplary configuration for a single instruction stream multiple data stream (SIMD) universal data processing module. As shown in FIG. 13B, the reconfigurable universal digital signal processing module 1301 is configured as a SIMD processing module to simultaneously carry out four operations. The four operations are provided with input data from inputs 1315, 1316, 1317, and 1318, and generate operation results on outputs 1319, 1320, 1321, and 1322. Further, an array 1312 of basic units 1302 are configured to implement a multiplication operation, a row 1323 of basic units 1302 is configured to implement a logic AND operation, a row 1324 of basic units 1302 is configured to implement a subtraction operation, a row 1325 of basic units 1302 is configured to implement an XOR operation, a row 1326 of basic units 1302 is configured to implement an addition operation, an array 1327 of basic units 1302 is configured to implement a right-shift operation, arrays 1328, 1329, 1330, and 1331 of basic units 1302 are configured to implement a multiplication-addition operation, arrays 1332 and 1334 of basic units 1302 are configured to implement a saturation operation, and a row 1333 of basic units 1302 is configured to implement an addition operation. Further, each row or array of basic units 1302 has a corresponding valid bit 1360-1372. If the valid bit for a row or an array is invalid, then the corresponding row or array of basic units 1302 can be shut down to save power.

Figure 13C:
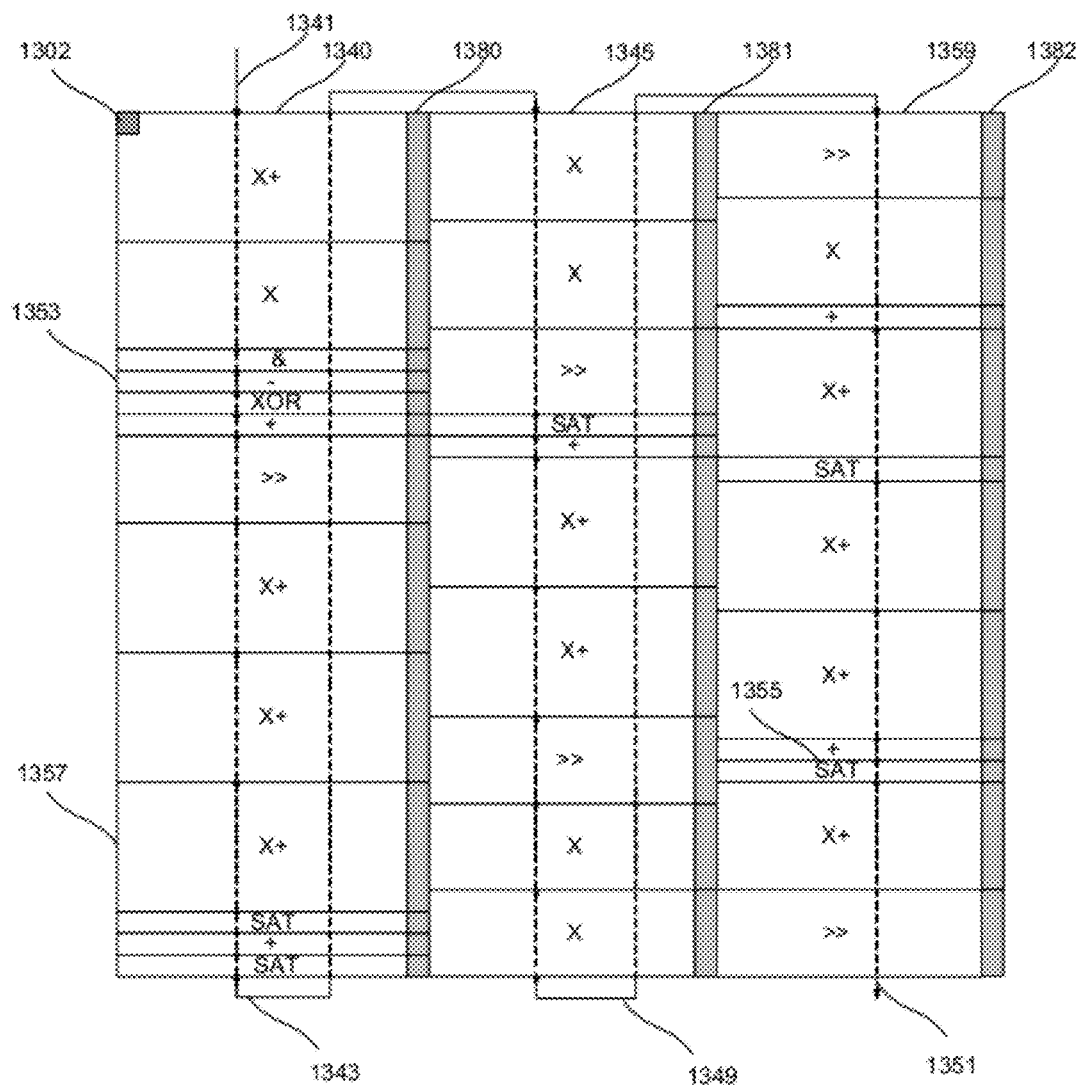
FIG. 13C illustrates an exemplary configuration for a serial universal data processing module consistent with the disclosed embodiments.

FIG. 13C illustrates an exemplary configuration for a serial universal data processing module. As shown in FIG. 13C, processing module 1340 is configured into a plurality of columns of processing units. An input 1341 is provided to processing module 1340, the input data 1341 is processed through path 1343 downwards, the data is processed by the current column of processing units and then outputted to array 1345 as inputs. Similarly, the input data to array 1345 is processed through path 1349 and then outputted to array 1359 as inputs, and a final output 1351 may be generated. That is, the basic units 1302 of processing module 1340 are configured to form process rows and arrays with different functions coupled in serial. For example, a row 1353 of basic units 1302 is configured to implement a subtraction operation, a row 1355 of basic units 1302 is configured to implement a saturation operation, an array 1357 of basic units 1302 is configured to implement a multiplication-addition operation, and an array 1359 of basic units 1302 is configured to implement a shift operation, etc. Further, the columns of processing units may be configured based on the width of the data to be processed, and each column may corresponding to a column validity bit 1380, 1381, or 1382. When the valid bit 1380, 1381, or 1382 is invalid, the corresponding row or array can be turned off to save power.

Figure 13D:
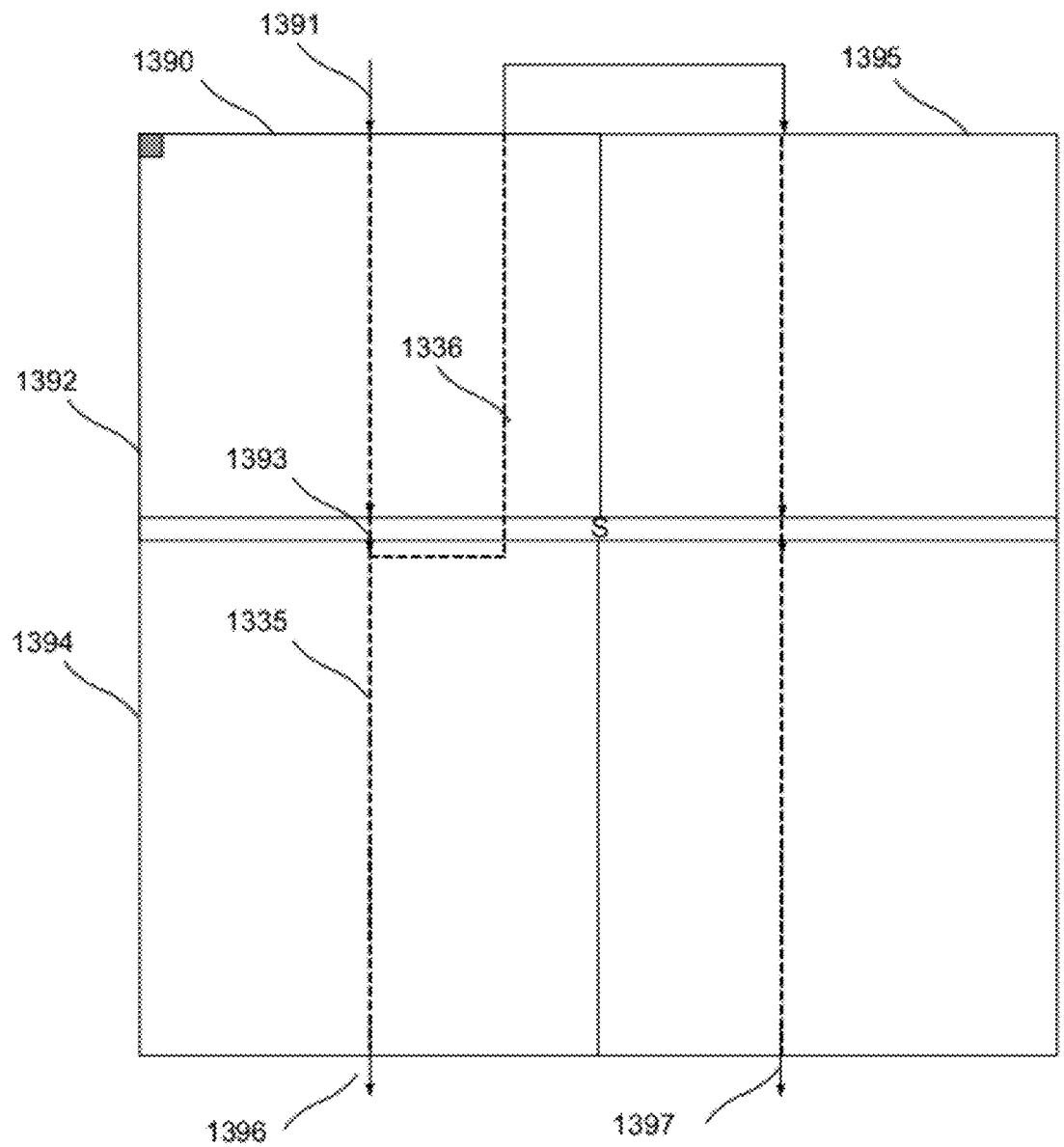
FIG. 13D illustrates an exemplary input and output configuration for a reconfigurable universal data processing module consistent with the disclosed embodiments.

FIG. 13D illustrates an exemplary input and output configuration for a reconfigurable universal data processing module. Processing module 1390 includes array 1392, array 1394, and array 1395. Processing module 1390 is provided with input data via an input 1391. The input data is processed by array 1392 to generate an output 1393, which is further passed separately to array 1394 and array 1395. The overall outputs of processing module 1390 are output 1396 and output 1397. More particularly, path 1335 is used to pass data downwards to other configured arrays or rows (e.g., array 1394) and path 1336 is used to pass data upwards (reverse bus) to upper level arrays or rows. The reverse path 1336 does not perform data processing when passing the data upwards.

Figure 13E:
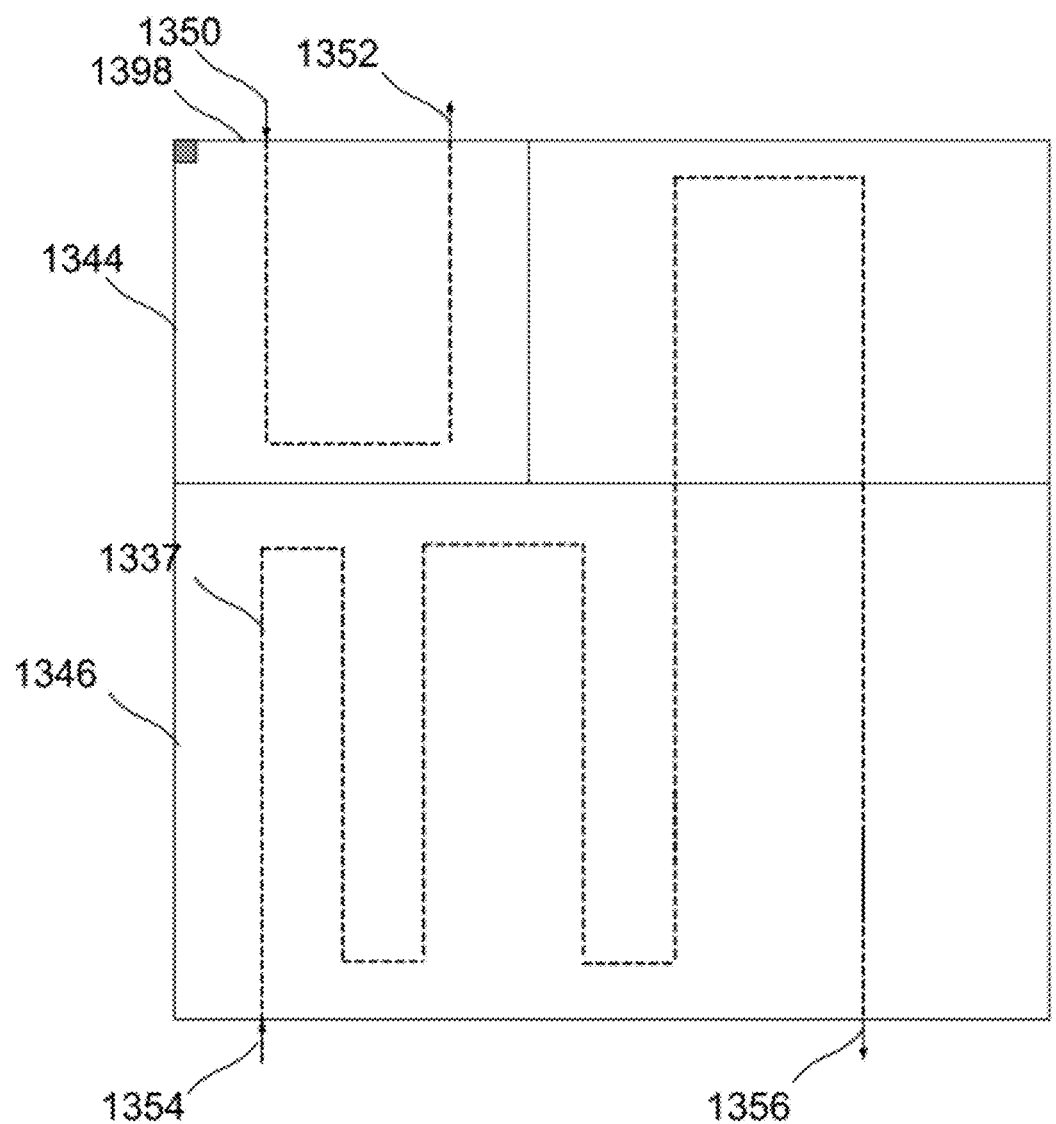
FIG. 13E illustrates another exemplary input and output configuration for a reconfigurable universal data processing module consistent with the disclosed embodiments.

FIG. 13E illustrates another exemplary input and output configuration for a reconfigurable universal data processing module. As shown in FIG. 13E, process module 1398 includes two independent arrays: array 1344 and array 1346. Inputs and outputs of the two arrays are also independent from each other. For example, array 1344 has an input 1350 and an output 1352; and array 1346 has an input 1354 and an output 1356. Similar to FIG. 13D, data processing is performed along the data path passing the data downwards, while data processing is not performed on reverse data path passing the data upwards. For example, input 1354 is passed through reverse data path or bus 1337 to array 1346 and then is processed.

Figure 14A:
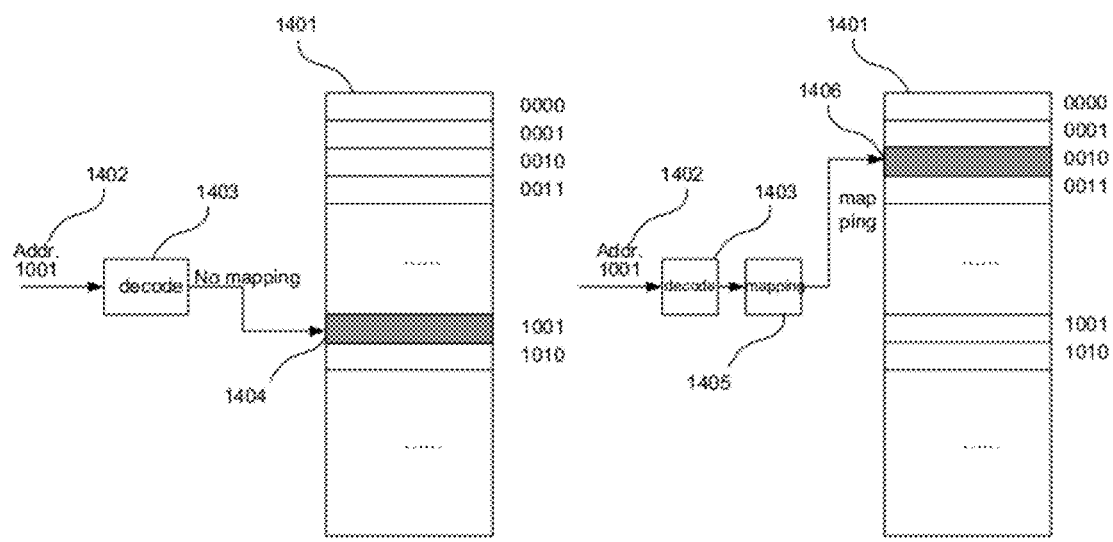
FIG. 14A illustrates an exemplary configuration for a reconfigurable memory address mapping consistent with the disclosed embodiments.

FIG. 14A illustrates an exemplary configuration for a reconfigurable memory address mapping. As shown in FIG. 14A, reconfigurable memory 1401 includes a plurality of words, each has a corresponding address. The reconfigurable memory 1401 may be configured to either perform address mapping or not to perform address mapping. For example, when the input address 1402 is binary '1001', if the reconfigurable memory 1401 is configured not to perform address mapping, the input address 1402 is decoded by decoding unit 1403 and finds the word 1404 corresponding to the binary address of '1001'. On the other hand, if the reconfigurable memory 1401 is configured to perform address mapping, the binary address '1001' is mapped by mapping unit 1405 to binary address '0010' and the word 1406 can be found corresponding to the actual binary address '0010'. Therefore, different addresses may be converted via the address mapping mechanism (e.g., virtual address and physical address).

Figure 14B:
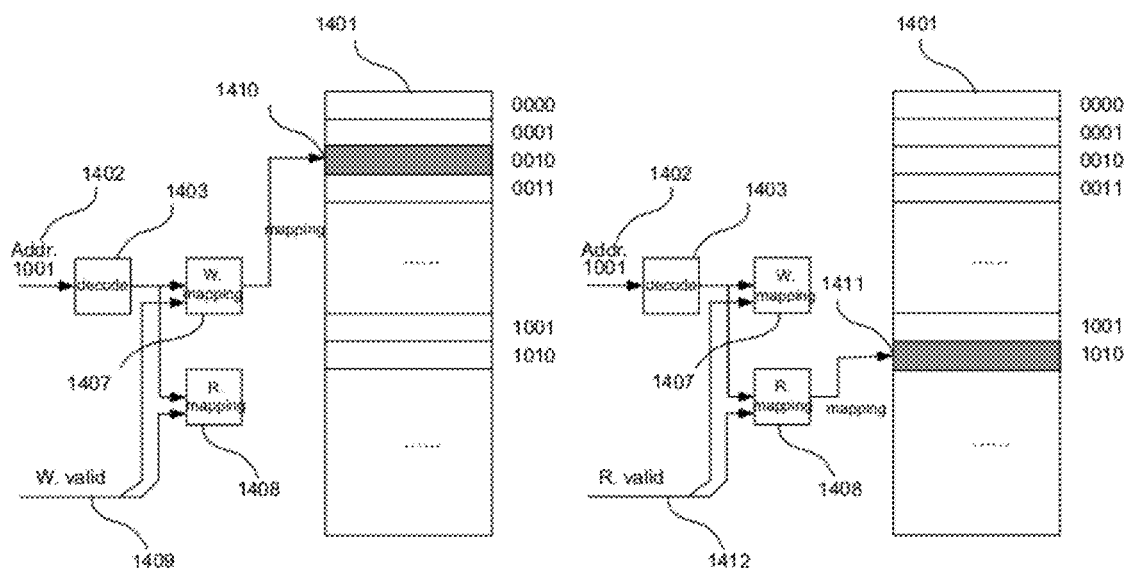
FIG. 14B illustrates an exemplary application of the reconfigurable memory consistent with the disclosed embodiments.

FIG. 14B illustrates an exemplary application of the reconfigurable memory. As shown in FIG. 14B, reconfigurable memory 1401 includes a plurality of words, each with a separate write address and a read address. For the same example where the input address 1402 is binary '1001', write address mapping 1407 converts the input address to binary '0010', while read address mapping 1408 converts the input address to binary '1010.' Thus, when the input address 1402 is binary '1001', if write valid bit 1409 is valid, write address mapping 1407 is functional, the input address 1402 is decoded by decoding unit 1403 and is further mapped by write mapping 1407 to binary address '0010' to find the word 1410. Such mapping may also be considered as between a logic or virtual address '1001' and a physical address '0010' for addressing the memory. On the other hand, if read valid bit 1412 is valid, read address mapping 1408 is functional, the input address 1402 is decoded by decoding unit 1403 and is further mapped by read mapping 1408 to binary address '1010' to find the word 1411. Such mapping may also be considered as between a logic address '1001' and a physical address '1010' for addressing the memory. Further, such mapping may make it easy to implement pixel reordering (zigzag) in image compression algorithms, and to implement first-in-first-out (FIFO) queues.

Figure 15A:
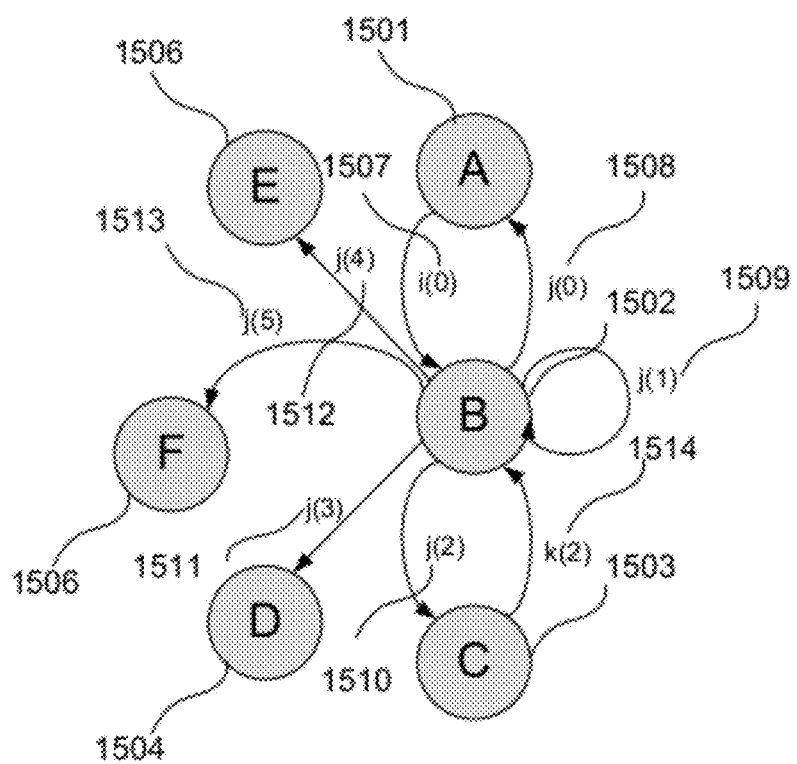
FIG. 15A illustrates exemplary states of a reconfigurable finite state machine (FSM) consistent with the disclosed embodiments.

FIG. 15A illustrates exemplary states of a reconfigurable finite state machine (FSM). As shown in FIG. 15A, when the current state of the FSM is state A (1501), if the input is i(0) (1507), then the FSM moves to state B (1502). When the current state of the FSM is state B (1502), if the input is j(0) (1508), then the FSM moves to state A (1501); if the input is j(1) (1509), then the FSM holds state B (1502) unchanged; if the input is j(2) (1510), then the FSM moves to state C (1503); if input is j(3) (1511), then the FSM moves to state D (1504); if input is j(4) (1512), then the FSM moves to state E (1505); and if the input is j(5) (1513), then the FSM moves to the state F (1506). Further, when the current state of the FSM is state C (1503), if the input is k(2) (1514), then the FSM moves to state B (1502). For illustrative purposes, certain states and state transition conditions are omitted.

Figure 15B:
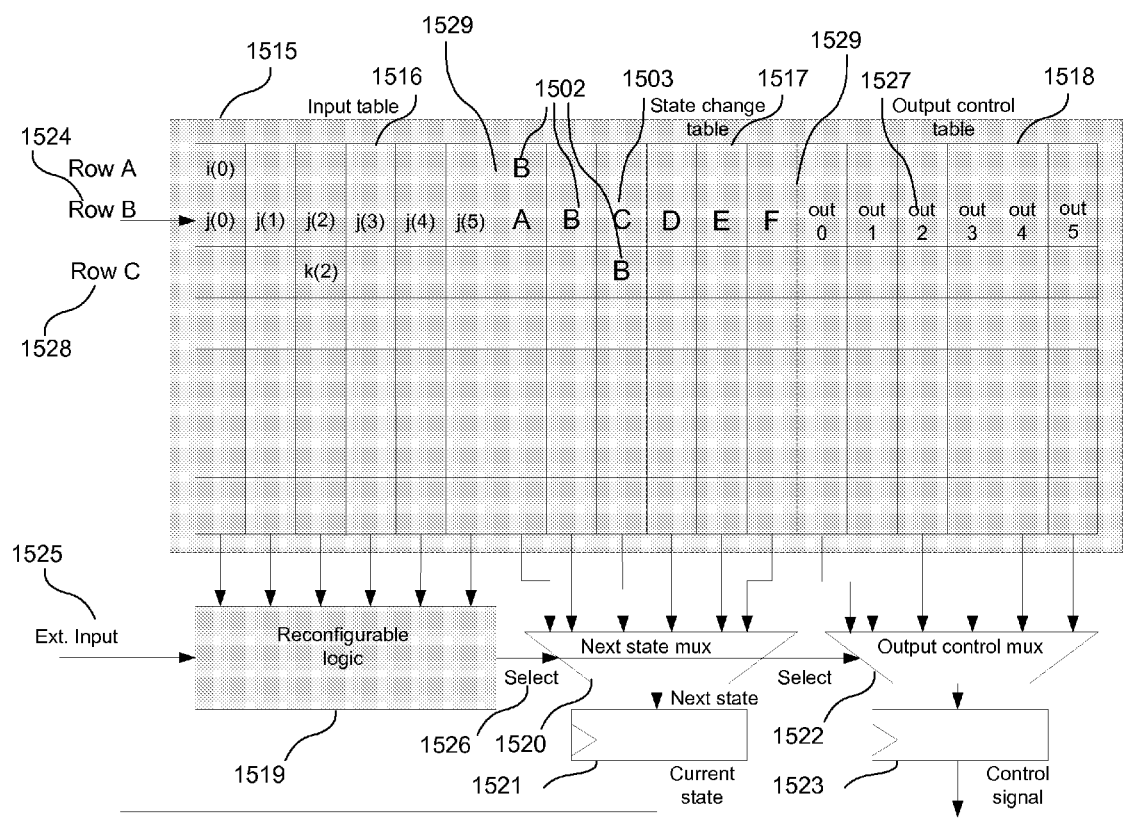
FIG. 15B illustrates an exemplary configuration for a reconfigurable FSM consistent with the disclosed embodiments.

FIG. 15B illustrates an exemplary configuration for a reconfigurable FSM. As shown in FIG. 15B, the reconfigurable FSM includes a random access memory 1515, a current state register 1521, and a reconfigurable multiplexer and reconfigurable random logic 1519. Each memory line of random access memory 1515 may include an input value 1516 of an input table, a state change value 1517 of a state change table, and an output control value 1518 of an output control table. The input value 1516 may represent an input state or a qualification, the state change value 1517 may represent a state transition value, and the output control value 1518 may be provided to other devices for control purpose. Further, the width of the memory line and various values may be predetermined. For example, in the random access memory 1515, the width of each line or word length is q, the width/word length of the input value 1516, the width/word length of the state change value 1517, and the width/word length of the output control value 1518 are, respectively, r, s, and t. That is, q=r+s+t, and a boundary ID register may be omitted. Reconfigurable random logic 1519 may provide logic for FSM operations, and may also include a counter to transit states based on the counting result of the counter.

When current state register 1521 contains a value representing the state B (1502), the FSM is in state B (1502), which corresponds to row B (1524) of random access memory 1515. Further, the stored value of row B (1524) is outputted from random access memory 1515. Among the outputted value, the r-bit input value output is transmitted to the reconfigurable logic 1519 as six groups of input status information; the s-bit state change value output is transmitted to the next state multiplexer 1520 as six groups of state transition information, and the t-bit output control value is transmitted to the output control multiplexer 1522 as six groups of output control signals.

Reconfigurable logic 1519 performs logic operations on the r-bit input data and the external input 1525 to generate the selection signal 1526. More particularly, the logic operations include determining whether external input 1525 matches the six groups of input status information of the input value and generating corresponding select signal 1526 for selecting outputs from next state multiplexer 1520 and output control multiplexer 1522. For example, when the external input is j(2), the resulting selection signal 1526 is configured to select state C from state change table 1517 and out2 (1527) from output control table 1518. The state C (1503) is then written to the current state register (1521). Further, in the next cycle, the row C (1528) in the random access memory 1515 is pointed to continue the state transition and control signal outputting of the FSM.

In addition, because the width/word length of the input value, the state change value, and the output control value is fixed, boundary ID register may be omitted. In certain conditions, the width/word length of the input value, the state change value, and the output control value may be dynamically adjusted, and boundary 1529 may be changed according to the value of boundary ID register.

Figure 15C:
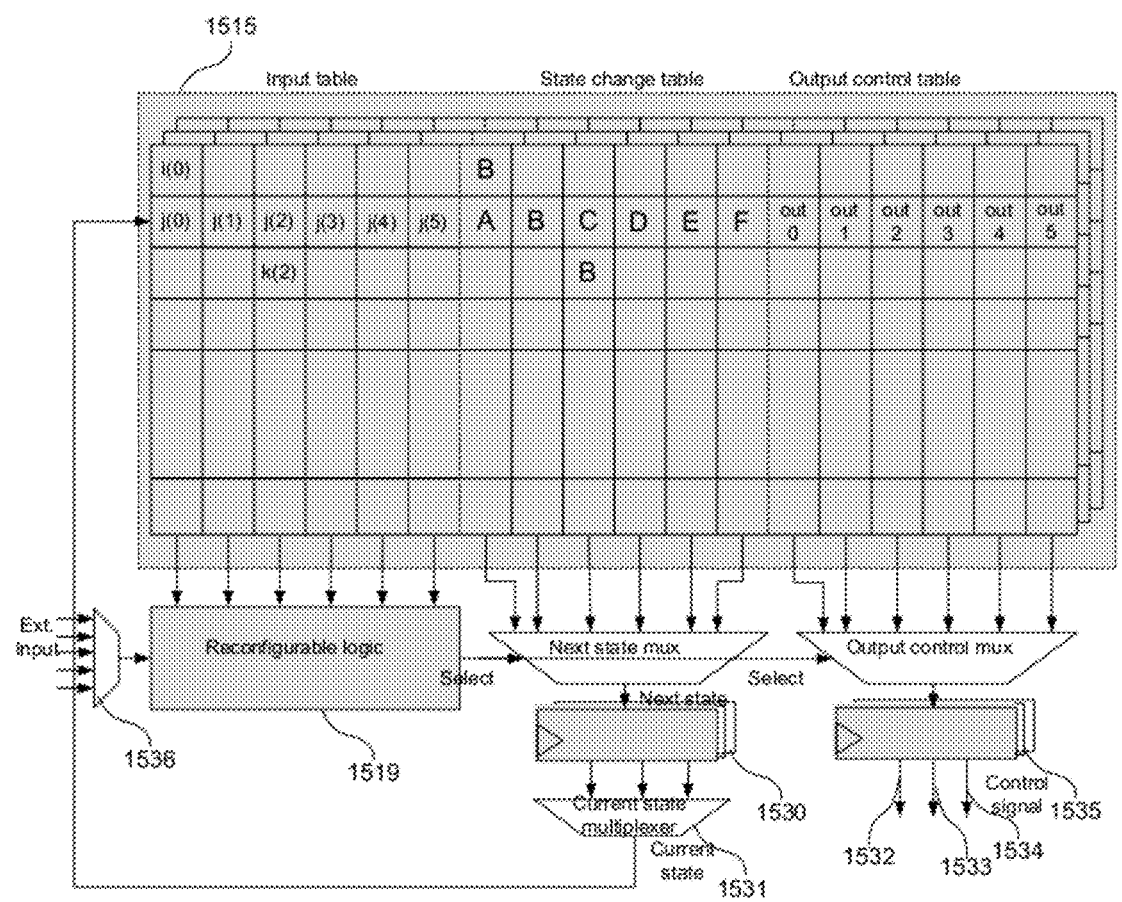
FIG. 15C illustrates an exemplary configuration for three concurrent state machines with the disclosed embodiments.

The disclosed reconfigurable FSM can also be configured to support multiple concurrent state machines. FIG. 15C illustrates an exemplary configuration for three concurrent state machines. As shown in FIG. 15C, comparing to the exemplary FSM in FIG. 15B, the size of random access memory 1515 is increased, an external input multiplexer 1536 is added, two current state registers 1530, a current state multiplexer 1531, and two control signal registers 1535 are provided. External input multiplexer 1536 is configured according to the configuration information to select a current input to the reconfigurable logic 1519. At any given time, only one finite state machine is running, with current values of the other two finite state machines being stored in the corresponding current state registers 1530. The newly added current state multiplexer 1531 is configured to select the value of the current state register of the running finite state machine as the current state. When switching the state machines, the state of the current state machine is stored in the current state register, and the current state multiplexer 1531 is used to select the value of the current state register of the finite state machine to be run as the current state to complete the state machine switching. The three control signal outputs 1532, 1533, and 1534 of the three state machines may be provided to other devices. The three control signals may also share actual control lines, and the number of the control signal register 1535 can be one or multiple.

The reconfigurable FSM supporting multiple concurrent state machines can be configured to correspond to finite state machines of different interface protocols in a time-multiplexed manner (e.g., time division multiplexing). Thus, a single hardware interface may be defined to be the input/output (I/O) port for multiple interface protocols to realize I/O port multiplexing and reconfiguration. For example, FIG. 16 illustrates an exemplary I/O port of four different protocols.

Figure 16:
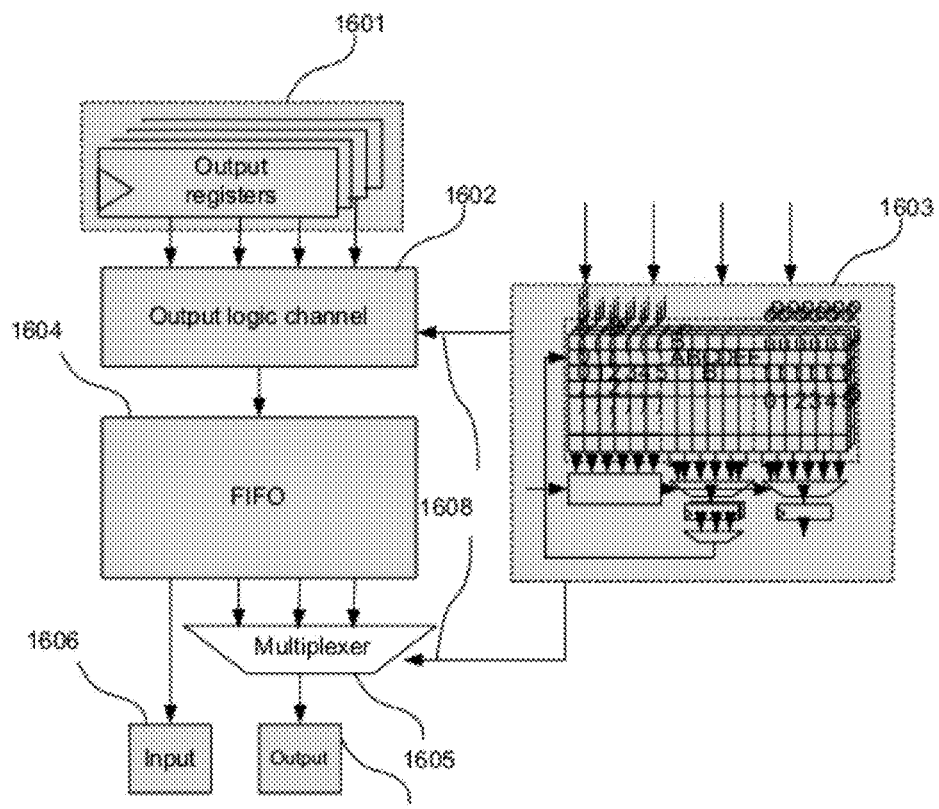
FIG. 16 illustrates an exemplary I/O port of four different protocols consistent with the disclosed embodiments.

As shown in FIG. 16, data outputted from different protocols are transmitted to output logic channel 1602 from output registers 1601. Output logic channel 1602 may be formed by configuring the basis units in a universal data processing module or may be random logic implemented by a reconfigurable control unit. The number of the output logical channel 1602 can be one or multiple. Further, the reconfigurable FSM 1603 may provide four state machines corresponding to the four different protocols and to generate corresponding control signal 1608.

Certain control signal 1608 may be used in the output logic channel 1602 to control data from the output registers 1601 into FIFO 1604 according to specific rules. FIFO 1604 stores individual output values from the I/O ports corresponding to four different protocols. The I/O port multiplexing, as used herein, may refer to a same state machine controlling different physical ports to realize different interface protocols, or a same state machine controlling a same physical I/O port or a same group of physical I/O ports to realize different interface protocols. For example, output port 1606 is a physical port for a single interface protocol, and output port 1607 is a physical port shared by other three interface protocols, with the reconfigurable FSM 1603 selecting from port multiplexer 1605 to implement time-multiplexing. In addition, output ports can all be physical ports each used solely for a specific interface protocol; part of output ports can be physical ports solely used for individual specific interface protocols and part of output ports can be physical ports reused by multiple interface protocols; or output ports can all be physical ports reused by multiple interface protocols. Thus, different interface protocols with same or different bit width may be flexibly used. It is noted that, although the example only illustrates output ports, input ports can be configured similarly.

Figure 17:
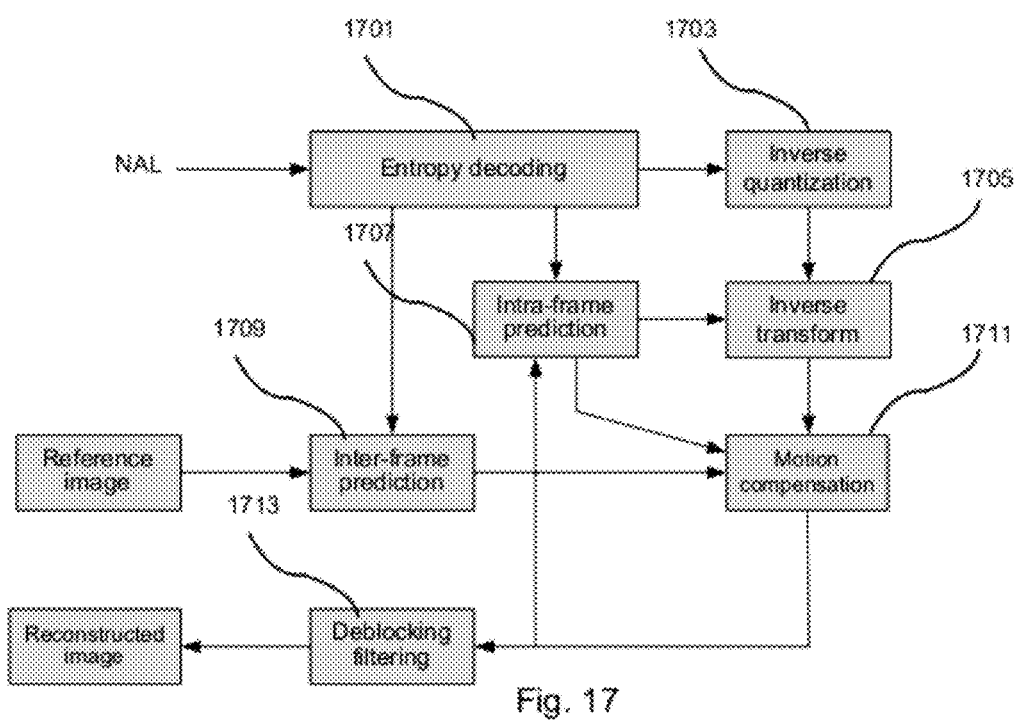
FIG. 17 illustrates an exemplary flow chart of a typical video decompression consistent with the disclosed embodiments.

FIG. 17 illustrates an exemplary flow chart of a typical video decompression implemented on the reconfigurable data processing platform. As shown in FIG. 17, encoded video data stream is provided to the reconfigurable video decompression system, which may support different video compression standards such as AVS, MPEG2, H.264/AVC, and others. More particularly, the video decompression process is divided into entropy decoding 1701, inverse quantization 1703, inverse transform 1705, intra-frame prediction 1707, inter-frame prediction 1709, motion compensation 1711, and deblocking filtering 1713, etc.

The basic operation of the inverse quantization 1703 in the various standards can be represented by $t_{ij}=(c_{ij} \times A)<<B$, where A and B may have different values for different standards. Thus, the reconfigurable data processing platform can be configured to provide different values to operation units to realize the inverse quantization 1703 for different standards.

The inverse transform 1705 in the various standards is mainly implemented using matrix multiplication, addition, and shifting operations, though the sizes of the matrix used by the various standards may be different. For example, the AVS standard uses an 8×8 matrix, and the H.264/AVC standard use a 4×4 matrix. The reconfigurable data processing platform can then be configured to provide matrixes with different sizes to realize the inverse transform 1705 for different standards.

Further, the intra-frame prediction 1707 in the various standards is implemented using multiplication-addition operations and shifting operations. However, the modes of intra-frame prediction 1707 in different standards are different. The coefficients of the operations and the number of multiplication operations and addition operations are therefore also different. The reconfigurable data processing platform can then be configured to provide different operation coefficients and different numbers of multiplication operations and addition operations to realize the intra-frame prediction 1707 for different standards.

In addition, the inter prediction 1709, the motion compensation 1711, and the deblocking filter 1713 may be different in the various standards, the reconfigurable data processing platform can then be configured differently according to different standards.

Figure 18:
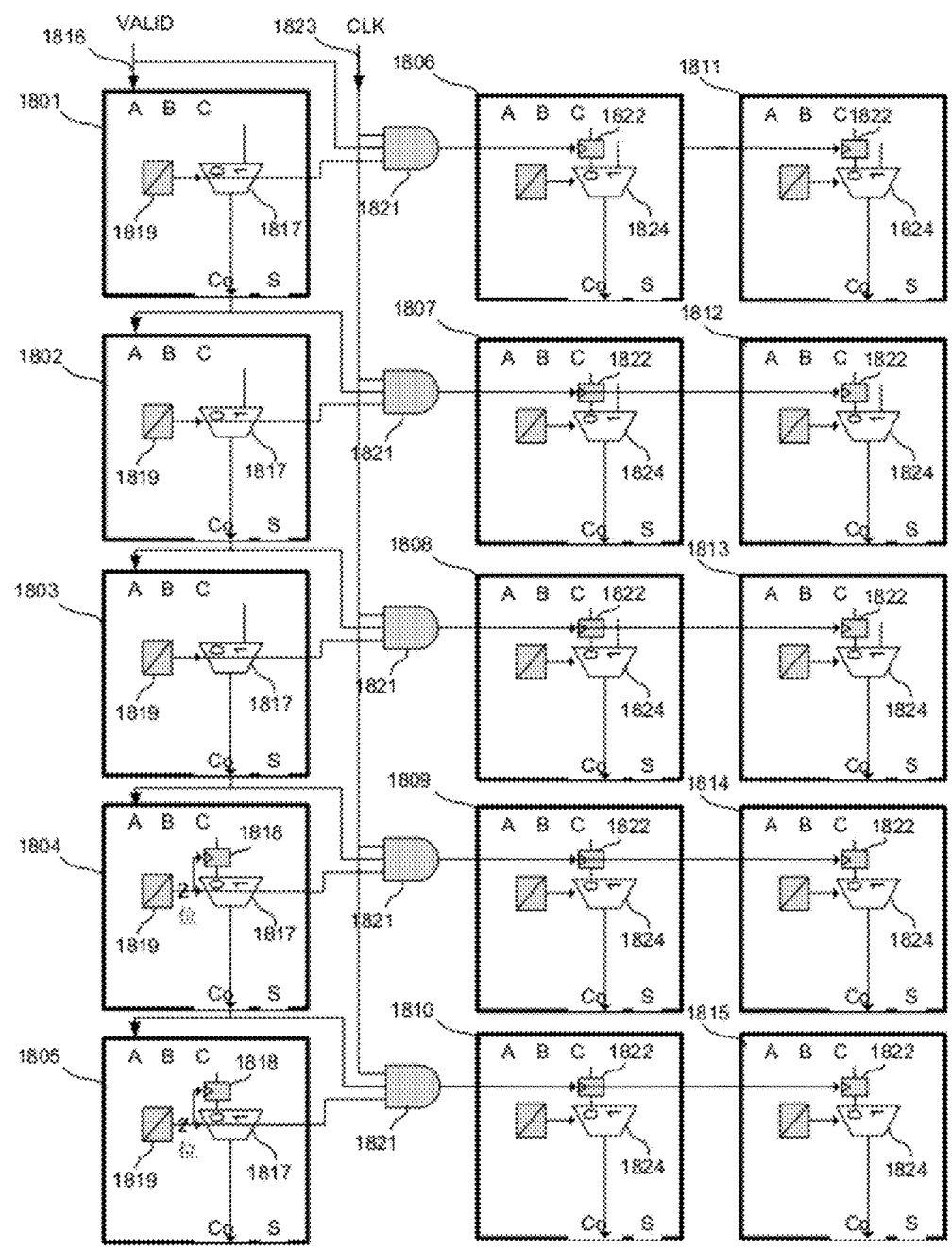
FIG. 18 illustrates an exemplary configuration for a multiplier with a valid bit mechanism consistent with the disclosed embodiments.

FIG. 18 illustrates an exemplary configuration for a multiplier with a valid bit mechanism. As shown in FIG. 18, basic units 1801-1815 are similar to basic unit 201 in FIG. 2A, and are configured to form a multiplier or multiplication unit. The rows containing basic units 1806, 1807, 1808, and 1809 perform accumulation of partial products within one clock cycle, and the row containing basic unit 1810 performs the addition operation (as the last step of the multiplication operation) in another clock cycle. The propagation of valid bit 1816 may be configured according to the functions to be implemented.

For example, as shown, the valid bits 1816 in the basic units 1801, 1802, and 1803 are provided without going through a register (not shown). Rather, the valid bits 1816 are propagated directly through multiplexer 1817 controlled by configuration memory cell 1819. The valid bits 1816 in the basic units 1804 and 1805 are first stored in registers 1818 and then propagated directly through multiplexer 1817 controlled by configuration memory cell 1819 in the next clock cycle. During the valid bit propagation process, the valid bit 1816 is also provided to three-input AND gate 1821 to control register 1822 of basic units 1806-1815 as to whether to store the input to the register 1822. The other two inputs to the three-input AND gate 1821 are the configuration information of the corresponding multiplexer 1817 and the clock signal 1823. Thus, after the configuration of the multiplier is completed, registers 1822 in the basic units 1806, 1807, 1808, 1811, 1812, and 1813 does not latch input, and the input to multiplexer 1824 is the input corresponding to the select signal of '1'. On the other hand, registers 1822 in the basic units 1809, 1810, 1814, and 1815 latch input, and the input to multiplexer 1824 for the input corresponding to the select signal of '0', i.e., the output of register 1822. In addition, the plurality of three-input AND gates 1821 may be a special column of three-input AND gates, or may be formed by configuring certain number of basic units.

Figure 19:
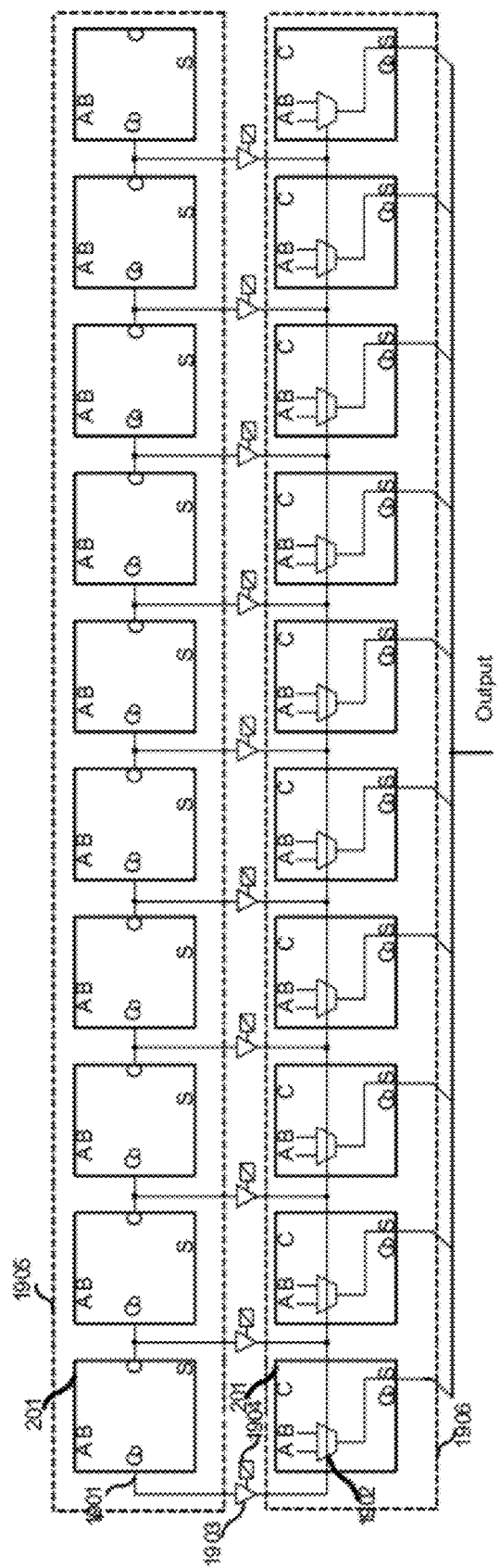
FIG. 19 illustrates an exemplary configuration for absolute value, saturation, and comparing-selecting operations consistent with the disclosed embodiments.

FIG. 19 illustrates an exemplary configuration for absolute value, saturation, and comparing-selecting operations. As shown in FIG. 19, three-state gate 1903 may be configured to be passing through or high impedance according to configuration information via configuration memory cell 1904. For example, when input data is N-bit wide, the three-state gate 1903 corresponding to the N−1 bit is turned on (passing through state), and the three-state gates 1903 of the remaining bits (N−2, . . . , 0) are configured to high impedance.

When being configured to implement the absolute value operation, the first row of the basic units 1905 outputs an operation result of the inversion of the input data plus one. The second row of the basic units 1906 can take input from the original input data or the operation result from the first row of the basic units 1905. The multiplexers 1902 in all second row basic units are controlled by the highest carry bit 1901 of the operation result of the first row (or configured to be the sign bit) to select either the original input data or the operation result of the first row as the output for the absolute operation.

When being configured to implement the saturation operation, the first row of the basic units 1905 outputs an operation result of an addition or subtraction. The second row of the basic units 1906 can take input from a predetermined maximum and/or minimum value or the operation result from the first row of the basic units 1905. The multiplexers 1902 in all second row basic units are controlled by the highest carry bit 1901 of the operation result of the first row (or configured to be the sign bit) to select either the operation result of the first row or the predetermined maximum or minimum value as the output for the saturation operation.

Further, when being configured to implement the comparing-selecting operation, the two operands are provided on the port A and port B, respectively, of the basic units 1905 and 1906. The first row of the basic units 1905 outputs an operation result of a comparing operation between input A and input B. The multiplexers 1902 in all second row basic units are controlled by the highest carry bit 1901 of the operation result of the first row (i.e., the comparison result) to select either the input A or input B as the output for the comparing-selecting operation.

Figure 20:
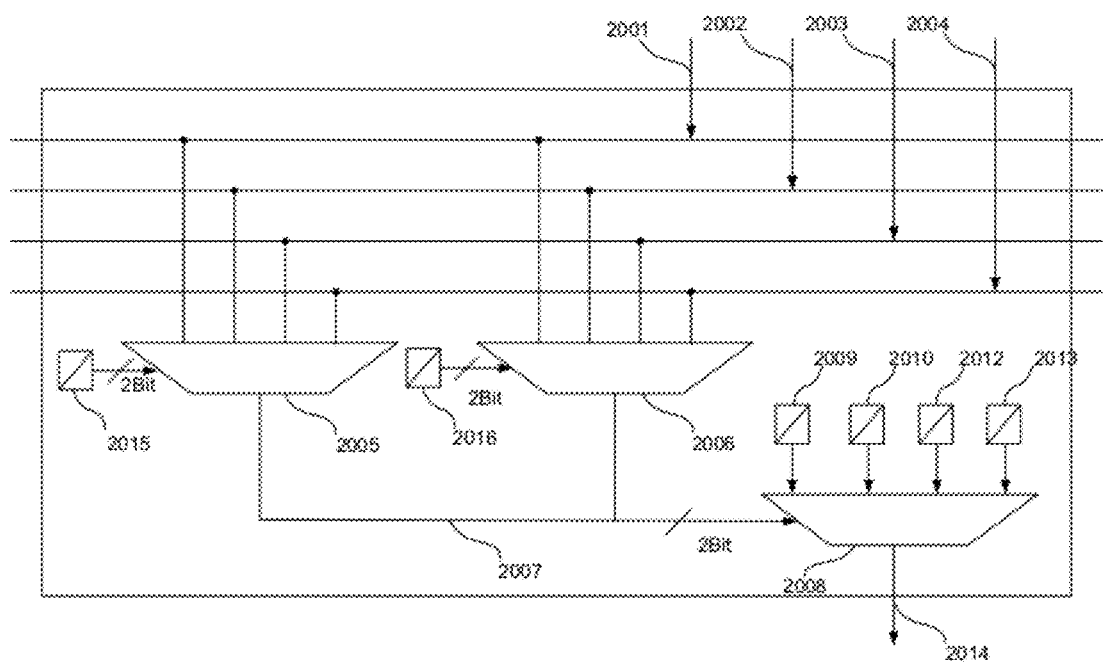
FIG. 20 illustrates an exemplary configuration for a reconfigurable random logic unit consistent with the disclosed embodiments.

FIG. 20 illustrates an exemplary configuration for a reconfigurable random logic unit. As shown in FIG. 20, the random logic unit is provided with four input bits 2001-2004 and configured to provide a result of any logic operation on the four bits. Configuration memory cell 2015 is configured to control multiplexer 2005 (e.g., a four-to-one selector) to select one bit from the input bits 2001-2004, and configuration memory cell 2016 is configured to control multiplexer 2006 (e.g., a four-to-one selector) to select one bit from the input bits 2001-2004. The two bits outputted from multiplexers 2005 and 2006 are provided as the select signal to multiplexer 2008 (e.g., a four-to-one selector) to select one of the four control signals from configuration memory cells 2009-2013 as the output 2014 of the random logic unit. Thus, any truth table associated with input bits 2001-2004 can be implemented. Further, more than one random logic unit may be connected together to implement random logic operations of data with different width.

As previously explained, the reconfigurable data processing platform is configured or reconfigured based on various types of configuration information. The configuration information can be stored within the data processing platform (e.g., configuration memory) or outside the data processing platform. If the configuration information is already stored in the reconfigurable data processing platform, the various modules can be directly configured or reconfigured using the stored configuration information. If the configuration information is stored outside the reconfigurable data processing platform, the reconfigurable data processing platform can be treated as memory, and the configuration information can be transferred to the various modules in the reconfigurable data processing platform by writing the configuration information into the memory. The configuration information can also be transferred to the reconfigurable data processing platform while the reconfigurable data processing platform is running to realize real-time reconfiguration.

Further, the configuration information transferred to the reconfigurable data processing platform can be the original configuration information without being encoded, or can be encoded configuration information. The encoding methods may include encryption and compression.

The configuration information can be generated manually or automatically via design tools according to certain mappings, including the mapping from a hardware description language (HDL) to the configuration information, from a computer programming language to the configuration information mapping, from computer models to the configuration information, and from algorithms to the configuration information, etc. The hardware description language may include Verilog HDL and VHDL; computer programming languages may include C, C++ and JAVA; computer models may include Matlab modeling; and the algorithms may include specific algorithm directive (pseudo instruction) descriptions. In certain circumstances, common configuration information template may be obtained in advance such that the design tools can directly use the configuration information template when generating the configuration information.

The reconfigurable data processing platform can also include expansion modules to accommodate a wide range of applications. For example, the expansion modules may include random logic controllers, analog units, central processors, digital signal processors (DSPs), packet header detectors, and logic zero detectors, etc.

Because the basic units of the reconfigurable data processing platform are of the same type or of a significantly small number of types, the delay among inputs and outputs of a basic unit can be determined in advance. All critical paths of interconnection are connected using high-speed interconnections and, thus, the delay along all the critical paths can be determined in advance as well. Therefore, timing closure may be skipped when configuring the reconfigurable data processing platform.

For example, in a 16×16-bit multiplication, the final delay depends on a 32-bit look-ahead full adder. During design, when it is determined that the accumulated delay of the partial products is less than the delay of the 32-bit full adder, the partial products can be transferred to the full adder to perform the final addition operation. However, when the accumulated delay of the partial products is greater than the delay of the 32-bit full adder, the number of the pipelines required by the multiplication unit is automatically increased in advance, and the intermediate values when accumulating the partial products are stored in a register(s). The stored values are used for partial product accumulation, and the partial products can then be transferred to the full adder to perform the final addition operation. Therefore, the delay of the reconfigurable universal data processing module can be determined in advance during the design process and can be built into the configuration information template to skip the timing closure.

The disclosed systems and methods may provide fundamental solutions to reconfigurable digital systems. The reconfigurable data processing platform can use a same hardware platform to realize different functions and, thus, can effectively reduce chip size and leakage current and can lower chip costs when compared with application specific integrated circuit (ASIC) having multiple hardware implementing the different functions. When compared with general-purpose processors or digital signal processors, the reconfigurable data processing platform contains a large amount of computing units to achieve the throughput and greater breadth of multi-issue capability that may be impossible to be reached by the general-purpose processors or digital signal processors. Further, when compared with FPGAs, the reconfigurable data processing platform is more structured (without using the lookup table, LUT), has more closely connections between the related logic and much simpler connection relationships between the logic. Thus, reconfigurable data processing platform can have higher performance and can more quickly change the configuration to switch from one operation mode to another. Further, the reconfigurable data processing platform can support relatively low-speed multiple functions simultaneously using a time division multiplexing method at high clock frequency.

In addition, when designing digital systems using the disclosed reconfigurable data processing platform, no timing closure is needed. Because basic units, rows of basic units, and arrays of basic units have known time delay characteristics, and basic units along the timing critical path are connected within a short distance, the delay of the rows or arrays in the preset templates is deterministic. Thus, it can be easy to calculate the delay based on the size and width of the logic in the design, and the timing closure can be skipped after the design. The possibility of reworking the design can be avoided and the development cycle can be effectively shortened.

Finally, the configuration information for the reconfigurable data processing platform can be automatically generated using tools according to mapping rules, which can be directly from hardware description language, computer programming languages, computer modeling, and algorithm description, etc. The development cycle can be reduced and design efficiency can be increased. Other applications and advantages are obvious to those skilled in the art.

What is claimed is:

1. A reconfigurable data processing platform, comprising:
a reconfigurable universal data processing module containing a plurality of basic units each capable of being configured to perform a unit of at least one of a logic operation and an arithmetic operation;
a configuration memory coupled to the reconfigurable universal data processing module to provide configuration information to be used to configure the plurality of basic units; and
a reconfiguration control unit coupled to the reconfigurable universal data processing module and the configuration memory to provide control signals for configuration of the plurality of basic units,
wherein a basic unit includes:
a first multiplexer configured to selectively accept a first set of inputs and to output a one-bit first multiplexer output;
a second multiplexer configured to selectively accept a second set of inputs and to output a one-bit second multiplexer output;
a third multiplexer configured to selective accept a third set of inputs and to output a one-bit third multiplexer output;
a carry logic coupled to the first multiplexer output, the second multiplexer output, and the third multiplexer output and to generate a one-bit carry output; and
a sum logic coupled to the first multiplexer output, the second multiplexer output, and the third multiplexer output and to generate a one-bit sum output.

2. The reconfigurable data processing platform according to claim 1, wherein:
a row of the basic units are coupled together to form an operation unit configured to perform one or more of addition, subtraction, and logic operation; and
two rows of the basic units are connected by pre-set high-speed local interconnections.

3. The reconfigurable data processing platform according to claim 1, wherein:
an array of the basic units formed by a plurality of rows of basic units and configured to perform one or more of multiplication, multiplication-addition, saturation, and shifting.

4. The reconfigurable data processing platform according to claim 1, wherein:
the plurality of basic units are configured in a row with a carry output of one basic unit being connected to one of the third set of inputs of another basic unit to form a carry chain such that the plurality of basic units form a full adder to add a first number provided on the first multiplexer and a second number provided on the second multiplexer.

5. The reconfigurable data processing platform according to claim 1, wherein:
the carry output and the sum output can be selective configured as direct outputs or delayed outputs from the carry logic and sum logic, respectively.

6. The reconfigurable data processing platform according to claim 1, wherein:
the plurality of basic units are configured as a data channel with a first number of rows of basic units performing partial product accumulation and a second number of rows performing addition of the accumulated partial products such that the plurality of basic units form a multiplication unit to multiply a multiplicand provided on the first multiplexer and a set of coefficients.

7. The reconfigurable data processing platform according to claim 6, wherein:
provided that n is the bit width of the multiplicand and m is the bit width of the multiplier, the first number of rows is represented as N/2 for signed multiplication operation where N is the smallest even number not less than n, and (N/2+1) for unsigned multiplication operation where N is the smallest even number greater than n; and
a total number of columns of the basic units associated with the first number of rows is represented as M×2+2.

8. The reconfigurable data processing platform according to claim 1, wherein:
the plurality of basic units are configured as a data channel separated horizontally into at least a sign operation unit, an exponent operation unit, and a mantissa operation unit to perform a floating point multiplication operation.

9. The reconfigurable data processing platform according to claim 1, wherein:
the plurality of basic units include a plurality of multiple vertical data processing basic units, each vertical data processing basic unit being placed between a predetermined number of rows of operational basic units to pass data downwards and upwards selectively with or without delay.

10. The reconfigurable data processing platform according to claim 1, wherein:
the reconfigurable universal data processing module is configured to form a plurality of rows and arrays of basic units to process multiple input data stream in parallel so as to perform a single instruction stream multiple data stream (SIMD) operation;
the each row or array corresponds to a valid bit; and
when the valid bit is set to invalid, the corresponding row or array is turned off to save power.

11. The reconfigurable data processing platform according to claim 1, wherein:
the reconfigurable universal data processing module is configured to form a plurality of columns of processing units connected in serial, each processing unit contains a plurality of rows and arrays of basic units, to process an input data stream in sequence;
the each row or array corresponds to a valid bit; and
when the valid bit is set to invalid, the corresponding row or array is turned off to save power.

12. The reconfigurable data processing platform according to claim 1, wherein:
the reconfigurable universal data processing module is configured to form a finite state machine including at least:
a random access memory containing a plurality of memory lines each includes an input value of an input table, a state change value of a state change table, and an output control value of an output control table;
a current state register for storing a current state of the finite state machine, each state corresponding to a memory line from the random access memory; and
a reconfigurable multiplexer and reconfigurable random logic for performing finite state machine operations based on the current state, the input value, and the state change value.

13. The reconfigurable data processing platform according to claim 12, wherein:
the finite state machine is configured to provide multiple state machines concurrently operative to support corresponding different interface protocols from a single input/output port in a time division multiplexing manner.

14. The reconfigurable data processing platform according to claim 1, wherein:
the reconfigurable universal data processing module is configured based on various configuration information generated according to at least one of mapping from a hardware description language (HDL) to the configuration information, mapping from a computer programming language to the configuration information, mapping from a computer model to the configuration information, and mapping from an algorithm to the configuration information.

15. The reconfigurable data processing platform according to claim 1, wherein:
the reconfigurable universal data processing module is configured based on various configuration information generated according to a predetermined configuration information template.

16. The reconfigurable data processing platform according to claim 1, wherein:
delay for basic units and associated interconnections in the reconfigurable universal data processing module are predetermined; and
the reconfigurable universal data processing module is configured without timing closure.

17. The reconfigurable data processing platform according to claim 1, wherein:
the reconfigurable universal data processing module is configured to include high-speed local interconnections and global bus; and
the high-speed local interconnections are configured to connect basic units and on timing critical paths.

* * * * *